US005796065A

United States Patent [19]

Fujiyoshi et al.

[11] Patent Number: 5,796,065

[45] Date of Patent: Aug. 18, 1998

[54] APPARATUS FOR PRODUCING CONTACT/ CONNECTION MEMBER FOR ELECTRIC AND ELECTRONIC PARTS

[75] Inventors: Kageakira Fujiyoshi; Daisuke Fujiyoshi; Takamichi Fujiyoshi, all of Kanagawa-ken, Japan

[73] Assignee: Jasty R & D Inc., Kanagawa-ken, Japan

[21] Appl. No.: 654,966

[22] Filed: May 29, 1996

[30] Foreign Application Priority Data

May 29, 1995 [JP] Japan .................................... 7-153916

[51] Int. Cl.[6] ............................ B23K 11/00; B23K 37/00

[52] U.S. Cl. ........................................ 219/78.02; 228/17.5

[58] Field of Search .............................. 219/78.01, 78.02, 219/79, 80, 81, 82; 228/17, 17.5, 48, 49.1, 49.5, 158

[56] References Cited

U.S. PATENT DOCUMENTS

| | | | |
|---|---|---|---|
| 4,830,094 | 5/1989 | Pazzaglia | 165/47 |
| 5,122,629 | 6/1992 | Stieger | 219/64 |
| 5,131,581 | 7/1992 | Geiermann | 219/79 |
| 5,148,960 | 9/1992 | Abbey, III et al. | 228/17.5 |
| 5,249,725 | 10/1993 | Nakatsu | 228/5.5 |
| 5,505,813 | 4/1996 | Scheifele et al. | 156/380.1 |

*Primary Examiner*—Matthew V. Nguyen
*Attorney, Agent, or Firm*—Howell & Haferkamp, L.C.

[57] ABSTRACT

An apparatus for producing a contact/connection member for electronic parts has a base material supply unit for continuously supplying a flexible belt-shaped base material, a wire material supply unit for continuously supplying a precious metal wire material, a welding unit for diffusion bonding the wire material to a surface of the base material by applying electricity to a mother rotation electrode and a variable rotation roller electrode while the wire material is pressed against the surface of the base material between the electrodes at a welding location, and a take-up unit for the bonded contact/connection member. A cooling unit may be provided for the welding unit. The apparatus produces a contact/connection member having a base material thickness of between 0.03 to 3.0 mm and a width of 3.0 to 300 mm in which the base material may be any of a variety of materials, including phosphor bronze, German silver, copper or other materials, and the wire member is a linear, stripe-shaped, shell-shaped, or hoop-shaped precious metal material such as gold, platinum, silver, or other precious metals or alloys.

20 Claims, 33 Drawing Sheets

FIG. 32
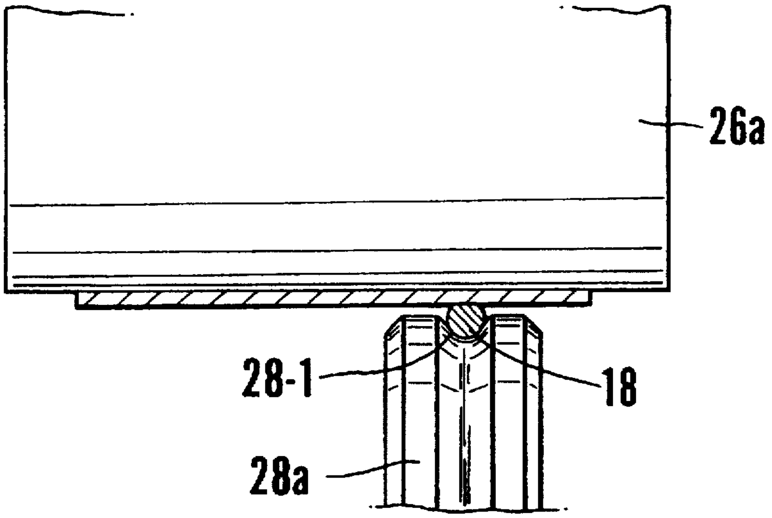
FIG. 33
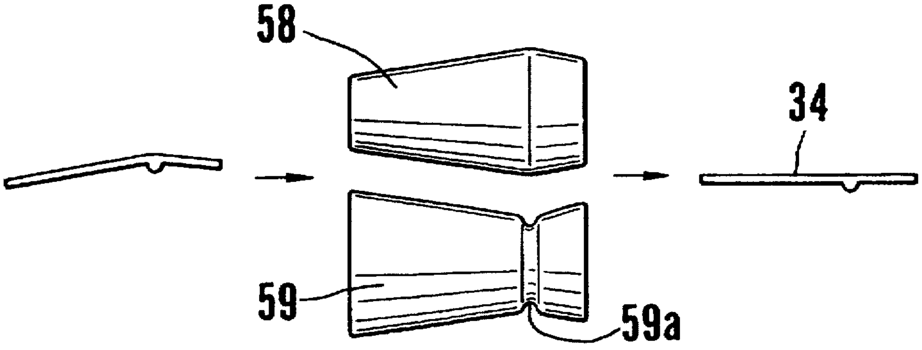
FIG. 34A
FIG. 34B

APPARATUS FOR PRODUCING CONTACT/ CONNECTION MEMBER FOR ELECTRIC AND ELECTRONIC PARTS

BACKGROUND OF THE INVENTION

1. Field of the Invention

This invention relates to an apparatus for producing a contact/connection member for electric and electronic parts which can be used to produce fixed contacts for various types of connectors, various types of relay contacts, fixed and semi-fixed contacts for various types of electric and electronic parts, various types of switch contacts, bimetal-precious metal contacts, brush contacts for micromotors, various types of multi-axis contacts, cermet trimmers, encoders, slot potentiometers and the like, and to a contact/ connection member for electric and electronic parts.

2. Description of the Prior Art

Heretofore, precious metal materials such as gold, platinum, silver, palladium and alloys thereof have been widely used in sliding contacts for use in various types of connectors, relays, switches, motor brushes and fixed and semi-fixed contacts for electric and electronic parts as well as make and break contacts for electric and electronic parts which are mechanically opened and closed repeatedly to meet needs for conductive stability, slidability, contact stability, oxidation resistance, sulfurizability, abrasion resistance, arc resistance and the like. Since these contacts are used together with spring function in most cases, a precious metal material for a contact part has been fused on part of a spring material such as phosphor bronze, german silver, stainless steel, brass or copper-nickel alloy which provides excellent spring function by electric welding or the like, or an entire contact member has been made of a flexible precious metal material selected among precious metal materials.

However, fusing a precious metal contact on a spring material is a delicate operation requiring a great deal of skill which causes such problems as poor work efficiency, difficulty of obtaining uniform-quality products and increased costs. On the other hand, production of the entire contact member from a precious metal material involves no problems with production and operation, but an increase in production costs cannot be avoided because the precious metal material is very expensive.

SUMMARY OF THE INVENTION

In view of the above defects of the prior art, it is an object of the present invention to provide an apparatus for producing a contact/connection member for electric and electronic parts which facilitates production and is capable of fixing a contact/connection member wire material on a contact/ connection member base material by resistance welding without fail as well as a contact/connection member for electric and electronic parts.

It is another object of the present invention to provide a contact/connection member production apparatus with which a contact/connection member having high fusion position accuracy can be produced by cooling not only a mother rotation electrode but also a variable rotation roller electrode.

It is a further object of the present invention to provide contact parts having various forms or structures which are obtained by processing contact/connection members produced with the above contact/connection member production apparatus having a cooling unit.

To attain the above objects, according to a first aspect of the invention, there is constructed a contact/connection member production apparatus which comprises a contact/ connection member base material supply unit for continuously supplying a belt-shaped contact/connection member base material which is a flexible base metal material, a contact/connection member wire material supply unit for continuously supplying a contact/connection member wire material which is a precious metal material, a welding unit for diffusion bonding the contact/connection member wire material to a predetermined position of the front or rear surface of the contact/connection member base material by applying electricity to a mother rotation electrode and a variable rotation roller electrode while the contact/ connection member wire material is pressed against the front or rear surface of the contact/connection member base material between these electrodes at a welding location, and a contact/connection member take-up unit for winding a contact/connection member in which the contact/connection member wire material is fusion bonded to the contact/ connection member base material.

According to a second aspect of the present invention, there is constructed a contact/connection member production apparatus which comprises a contact/connection member base material supply unit for continuously supplying a belt-shaped contact/connection member base material which is a base metal material, a contact/connection member wire material supply unit for continuously supplying a contact/ connection member wire material which is a precious metal material, a welding unit for diffusion bonding the contact/ connection member wire material to a predetermined position of the rear surface of the contact/connection member base material by applying electricity to a mother rotation electrode and a variable rotation roller electrode while the contact/connection member wire material is pressed against the rear surface of the contact/connection member base material between the mother rotation electrode arranged above a welding location and the variable rotation roller electrode arranged below the welding location, a cooling unit for cooling the mother rotation electrode of the welding unit and directly cooling the variable rotation roller electrode with cooling water, and a contact/connection member take-up unit for winding the contact/connection member in which the contact/connection member wire material is fusion bonded to the contact/connection member base material.

In a contact/connection member for electric and electronic parts which is produced with the contact/connection member production apparatus of the present invention, the contact/ connection member base material is a base metal material having a thickness of 0.03 to 3.0 mm and a width of 3.0 to 300 mm, which is selected among phosphor bronze, german silver, 42 Alloy, covar, austenite stainless steel, ferrite stainless steel, martensite stainless steel, brass, copper-nickel alloy, copper-beryllium alloy, copper, copper alloy, iron, iron alloy, magnetic materials, laminate materials consisting of non-ferrous materials and ferrous materials, laminate materials consisting of base metals and precious metals, bonded materials consisting of non-ferrous or ferrous metals and polymer films, and the like; and the contact/connection member wire material is a linear material having a diameter of 0.03 to 3.00 mm, a stripe-shaped material measuring 0.03×0.06 mm to 3.0 to 3.0 mm, a shell-shaped material measuring 0.03×0.08 mm to 2.0×3.0 mm, or a hoop-shaped material measuring 0.01 to 0.50 mm to 1.0×10.0 mm and a precious metal material selected among gold, gold alloys, platinum, platinum alloys, silver, silver alloys, palladium, palladium alloys, three-element precious metal alloys, four-element precious metal alloys, five-element precious metal alloys, six-element precious metal alloys, seven-element precious metal alloys, multi-element precious metal alloys and the like.

BRIEF DESCRIPTION OF THE DRAWINGS

FIG. 32 is an enlarged view of key parts of the welding unit of the seventh embodiment;

FIG. 33 is a diagram for explaining the levelling process of the contact/connection member production apparatus of the seventh embodiment;

FIGS. 34A and 34B are diagrams for explaining the flattening process of the contact/connection member production apparatus of the seventh embodiment;

DETAILED DESCRIPTION OF THE PREFERRED EMBODIMENT(S)

The invention will now be described in detail by reference to the accompanying drawings.

Figure 1:
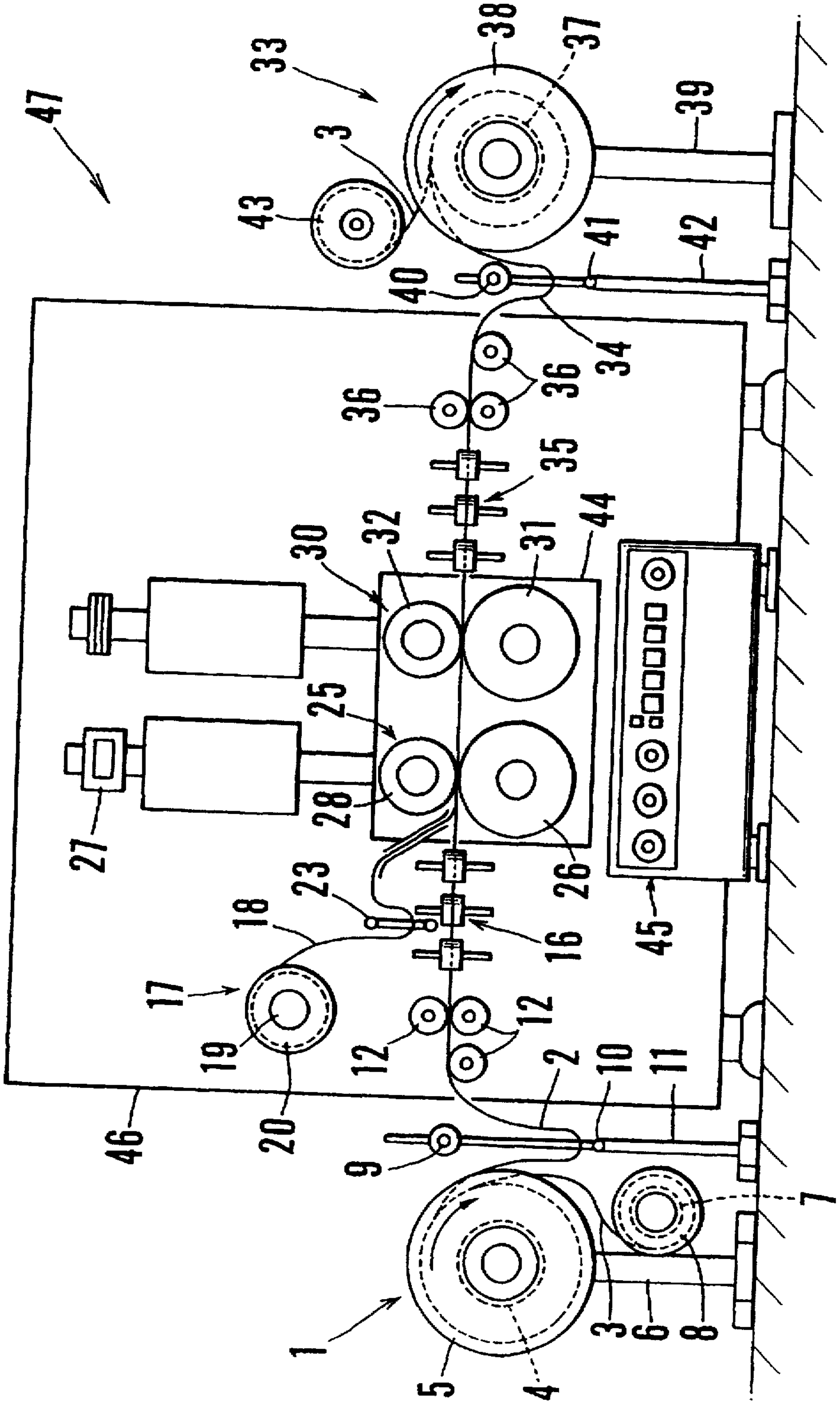
FIG. 1 is a schematic front view showing the entire configuration of a contact/connection member production apparatus according to a first embodiment of the present invention.
Figure 2:
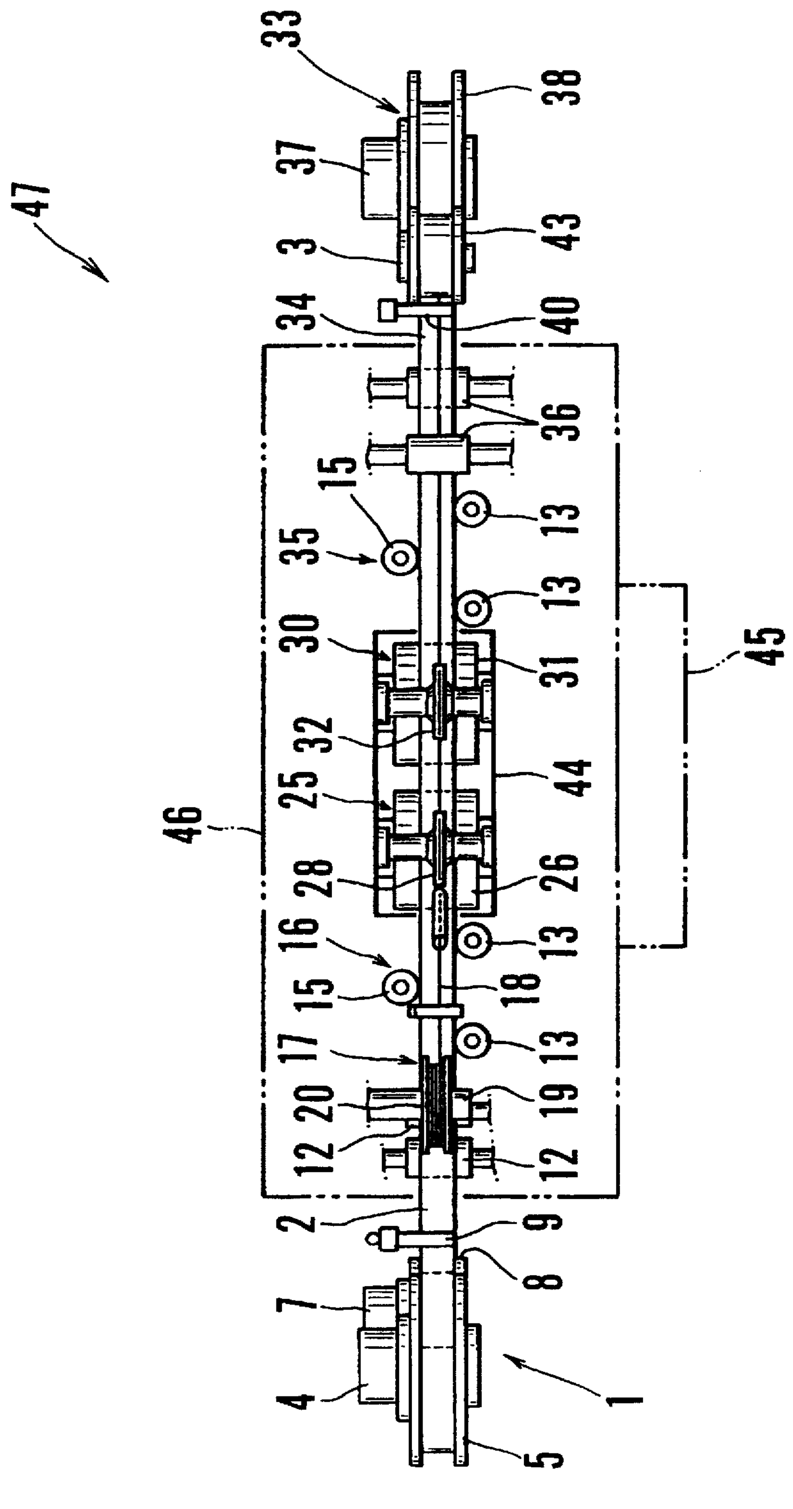
FIG. 2 is a schematic plan view of key parts of the contact/connection member production apparatus of FIG. 1.
Figure 3:
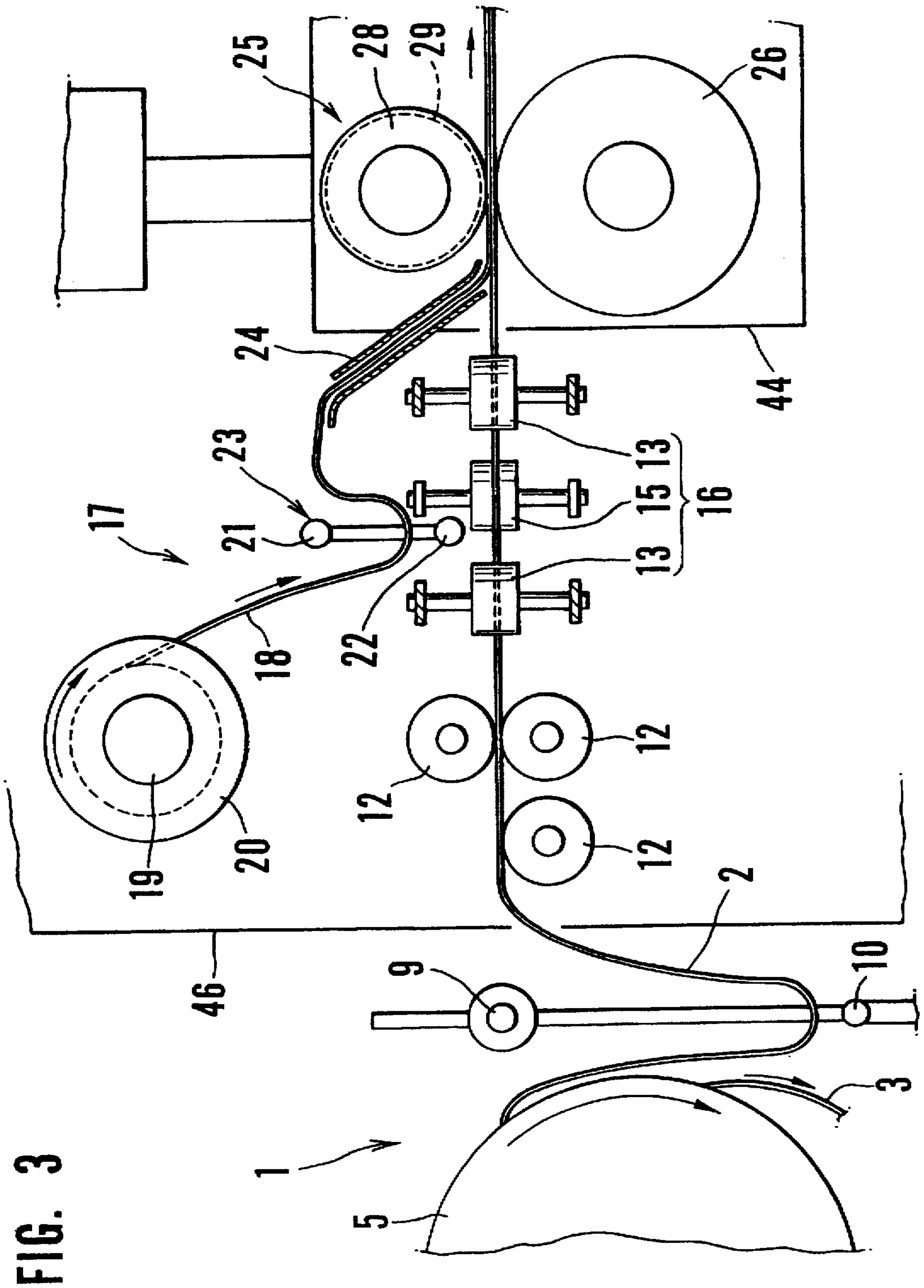
FIG. 3 shows schematically the constitution of the contact/connection member production apparatus of FIG. 1 from a contact/connection member base material supply unit to a seam welding unit.
Figure 4:
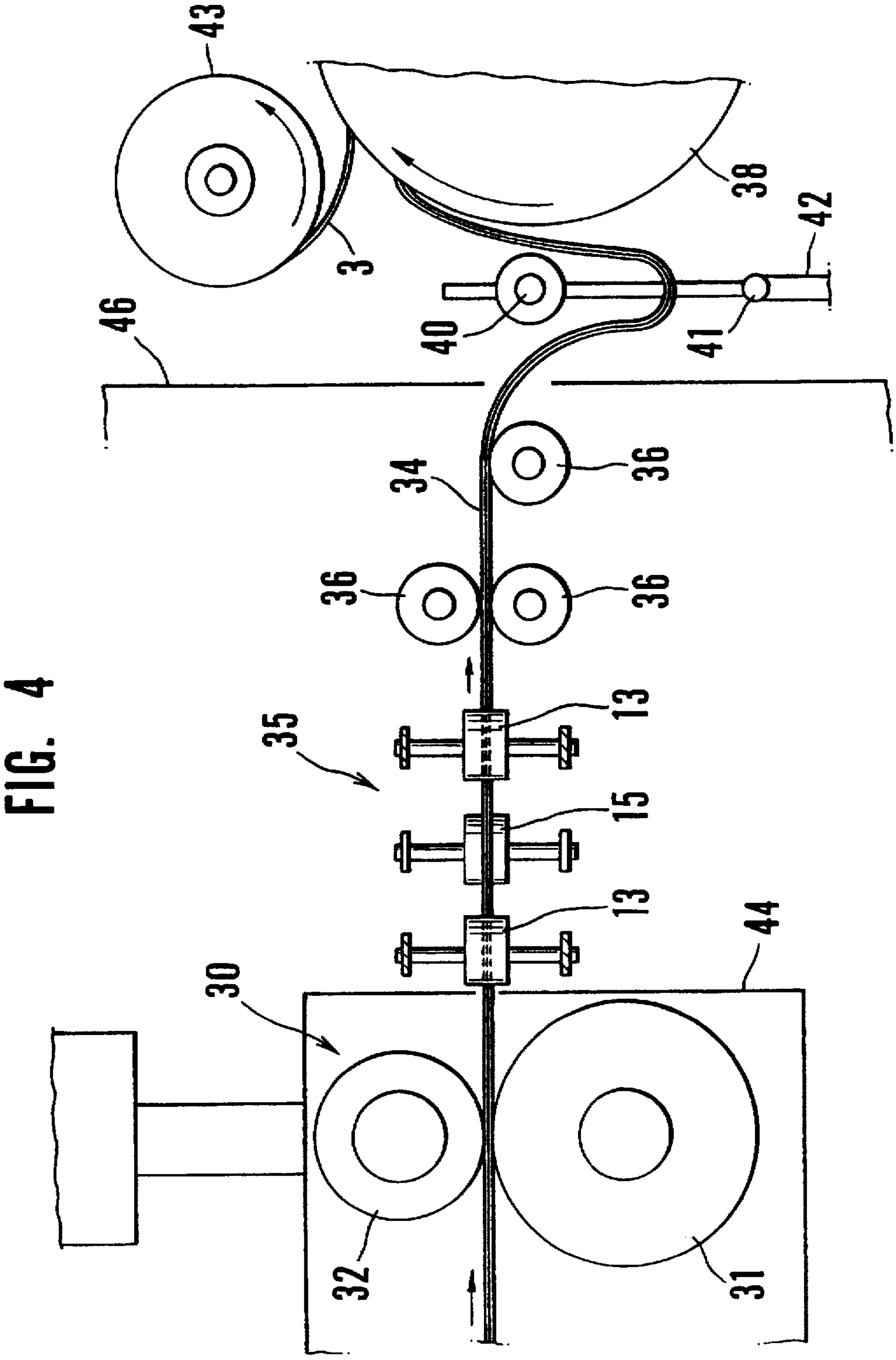
FIG. 4 shows schematically the constitution of the first embodiment from a pressure unit to a contact/connection member take-up unit.
Figure 5:
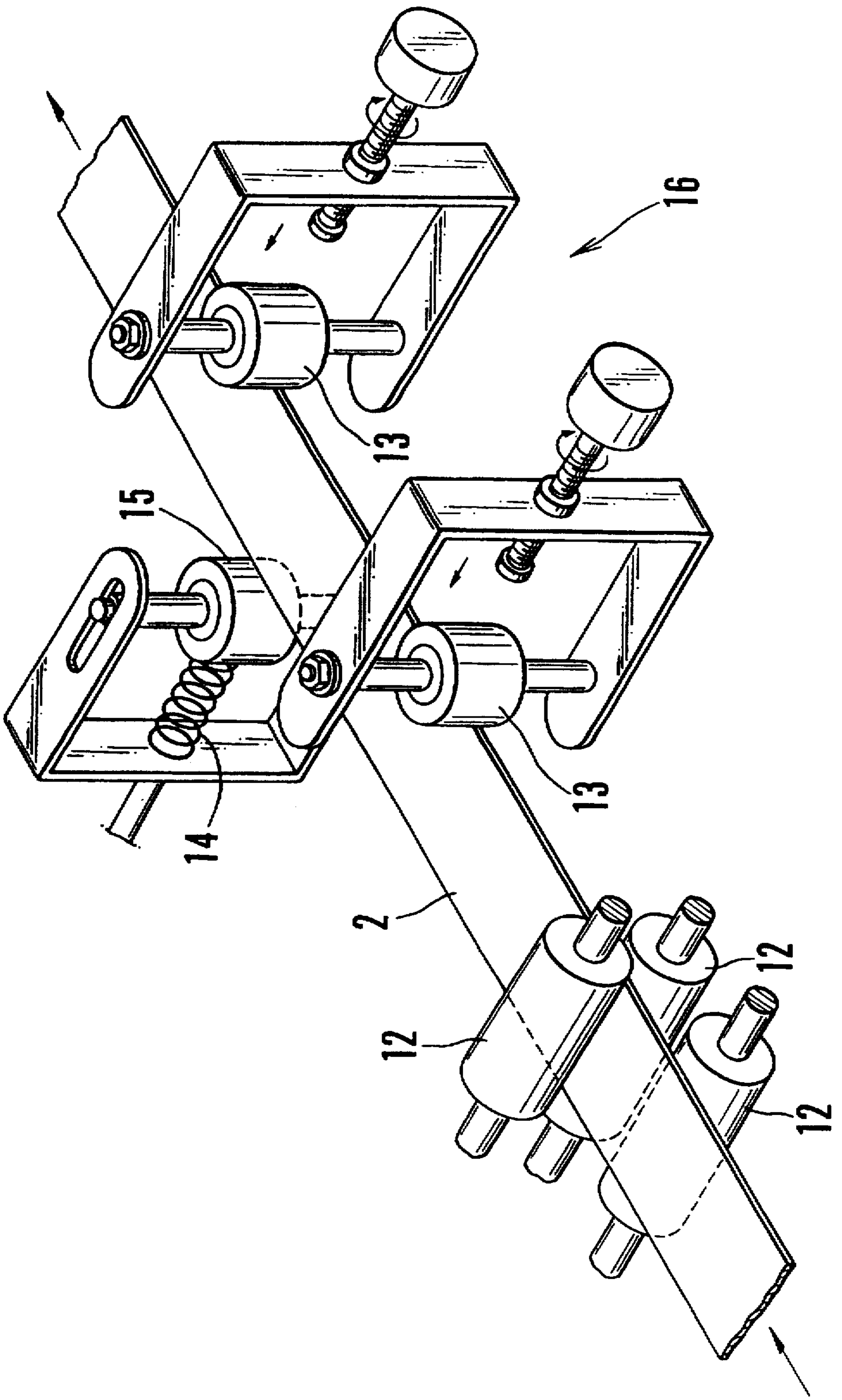
FIG. 5 is a perspective view of key parts of the contact/connection member base material supply unit of the first embodiment.
Figure 6:
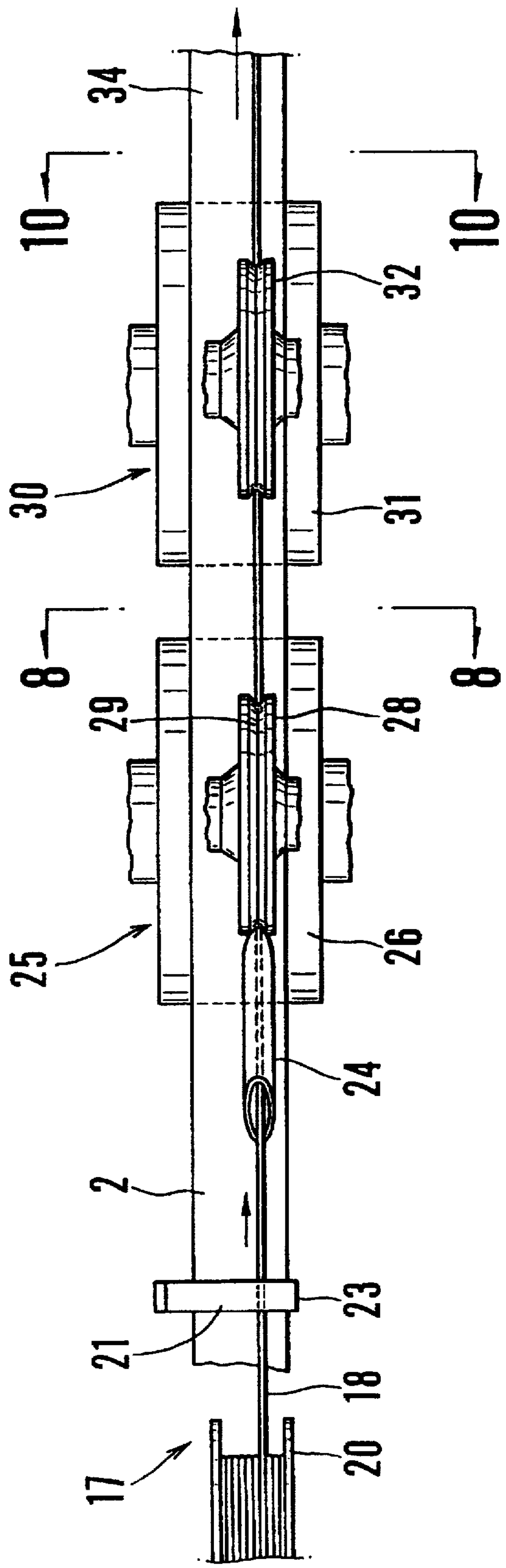
FIG. 6 is a plan view of key parts of the contact/connection member wire material supply unit of the first embodiment.

In a first embodiment of the present invention shown in FIG. 1 through FIG. 12, reference numeral 1 represents a contact/connection member base material supply unit. This contact/connection member base material supply unit 1, as shown in FIGS. 3, 5 and 6, comprises a supply reel stand 6 for rotatably supporting a supply reel 5 which is rotated by a motor 4 and around which a contact/connection member base material 2 is wound via insertion paper 3, an insertion paper take-up reel 8 for winding the insertion paper 3, which is attached to the supply reel stand 6 and rotatable by a motor 7, an automatic base material supply stand 11 for adjusting the supply of the contact/connection member base material 2 supplied from the supply reel 5, which is provided with sensors 9 and 10 for turning on and off the motors 4 and 7 at upper and lower portions thereof, a plurality of (three in this embodiment) vertical positioning guide rollers 12, 12 and 12 for positioning in a vertical direction the contact/connection member base material 2 supplied through the automatic base material supply stand 11, and horizontal positioning guide rollers 16 which consist of a pair of fixed guide rollers 13 and 13, which are position adjustable, for positioning in a horizontal direction the contact/connection member base material 2 which has passed over the vertical positioning guide rollers 12, 12 and 12, and a movable guide roller 15 which is urged by a spring 14 so that one side of the contact/connection member base material 2 is pressed against the pair of fixed guide rollers 13 and 13.

The contact/connection member base material 2 is a material having a thickness of 0.03 to 3.0 mm and a width of 3.0 to 300 mm, which is selected among phosphor bronze, german silver, 42 Alloy, covar, austenite stainless steel, ferrite stainless steel, martensite stainless steel, brass, copper-nickel alloy, copper, copper alloy, iron, iron alloy, magnetic materials, laminate materials consisting of non-ferrous materials and ferrous materials, laminate materials consisting of base metal materials and precious metal materials, bonded materials consisting of various types of non-ferrous or ferrous metals and polymer films, and the like.

Reference numeral 17 represents a contact/connection member wire material supply unit for supplying a contact/connection member wire material 18 over the top of the contact/connection member base material 2 which has passed over the horizontal positioning guide rollers 16 of the contact/connection member base material supply unit 1. This contact/connection member wire material supply unit 17, as shown in FIG. 3 and FIG. 5, comprises a wire material supply reel 20 which is rotated by a motor 19 and around which a contact/connection member wire material 18 is wound, an automatic wire material supply sensor 23, provided with sensors 21 and 22 for turning on and off the motor 19 at upper and lower portions thereof, for adjusting the supply of the contact/connection member wire material 18 supplied from the wire material supply reel 20, and a guide nozzle 24 for guiding the contact/connection member wire material 18 which has passed through the automatic wire material supply sensor 23 to a predetermined position of the contact/connection member base material 2.

The contact/connection member wire material 18 is a linear material having a diameter of 0.03 to 3.00 mm, a stripe-shaped material measuring 0.03×0.06 to 3.0 to 3.0 mm, a shell-shaped material measuring 0.03×0.08 mm to 2.0×3.0 mm, or a hoop-shaped material measuring 0.01 to 0.50 mm to 1.0 to 10.0 mm and a precious metal material selected from among gold, gold alloys, platinum, platinum alloys, silver, silver alloys, palladium, palladium alloys, three-element precious metal alloys, four-element precious metal alloys, five-element precious metal alloys, six-element precious metal alloys, seven-element precious metal alloys, multi-element precious metal alloys and the like.

A linear material for use as the contact/connection member wire material 18 has a round or oval section.

Figure 7A:
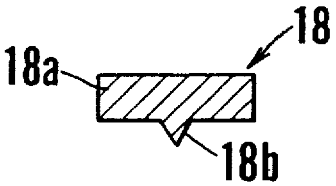
FIGS. 7A, 7B, 7C, 7D, 7E and 7F are sectional views showing the sections of wire materials for various contact/connection member which can be used in the present invention.
Figure 7B:
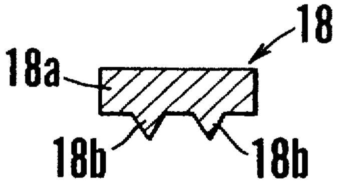

A stripe-shaped material for use as the contact/connection member wire material 18 has a square or rectangular section, or consists of a square or rectangular body 18a and a single projection 18b formed on the body 18a as shown in FIG. 7A (a rectangular body 18a and a single projection 18a in this embodiment), a rectangular body 18a and two projections 18b and 18b formed on the body 18a as shown in FIG. 7B, or a rectangular body 18a and more than two projections 18b formed on the body 18a.

Figure 7C:
Figure 7D:
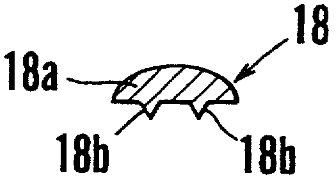

A shell-shaped material for use as the contact/connection member wire material 18 has a semicircular or semioval section, or consists of a semicircular or semioval body 18a and a single projection 18b formed on the body 18a (a semicircular body 18a and one projection 18b in this embodiment) as shown in FIG. 7C, a semioval body 18a and two projections 18b and 18b formed on the body 18a as shown in FIG. 7D, or a body 18c and two or more projections 18b formed on the body 18a.

Figure 7E:
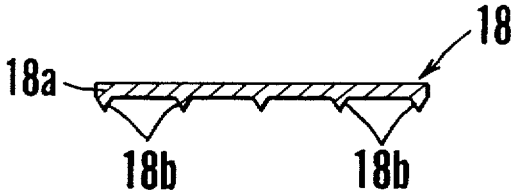
Figure 7F:
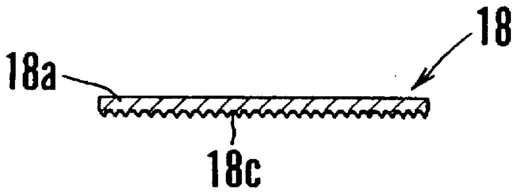
Figure 8:
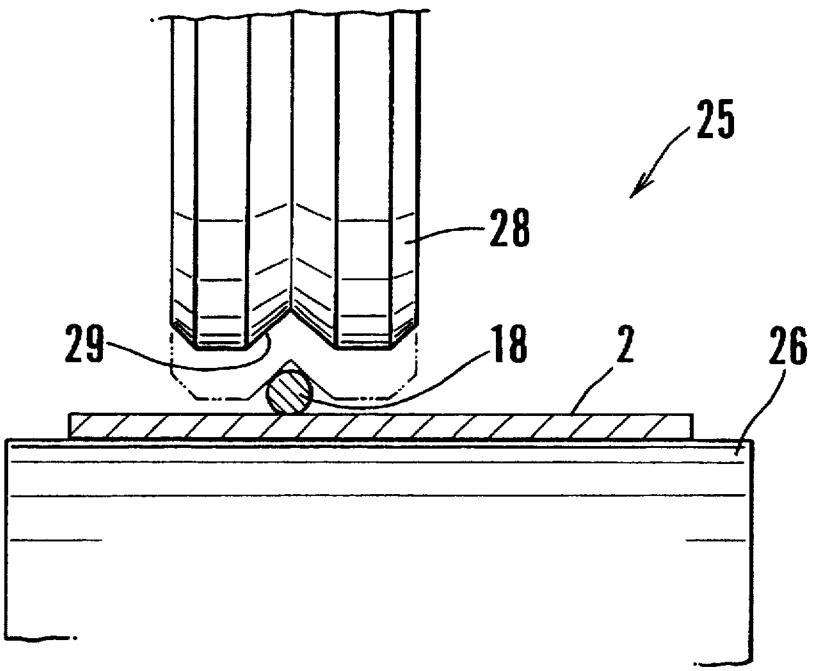
FIG. 8 shows a welding section of the seam welding unit of the first embodiment taken along the line 8—8 in FIG. 6.

A hoop-shaped material for use as the contact/connection member wire material 18 has a rectangular section, or consists of a rectangular body 18a and a plurality of projections 18b and 18b formed on the body 18a as shown in FIG. 7E, or a body 18a having a meshed, expanded or irregular surface 18c to be welded as shown in FIG. 7F.

The hoop-shaped material may be a base metal with a precious embossed metal ribbon attached thereon.

Reference numeral 25 represents a seam welding unit for fusing and fixing the contact/connection member wire material 18 to the contact/connection member base material 2 through diffusion bonding, which is positioned at a downstream of the contact/connection member wire material supply unit 17. This seam welding unit 25, as shown in FIGS. 3, 6 and 9, comprises a mother rotation electrode 26 for supporting the contact/connection member base material 2, and a variable rotation roller electrode 28 for pressing the contact/connection member base material 2 and the contact/connection member wire material 18 against the mother rotation electrode 26, to which a positive current controlled to a predetermined level is supplied from a welding power supply head 27. A recess 29 for accepting part of the contact/connection member wire material 18 is formed in the variable rotation roller electrode 28 so that the contact/connection member wire material 18 can be positioned, molded and guided.

Figure 9A:
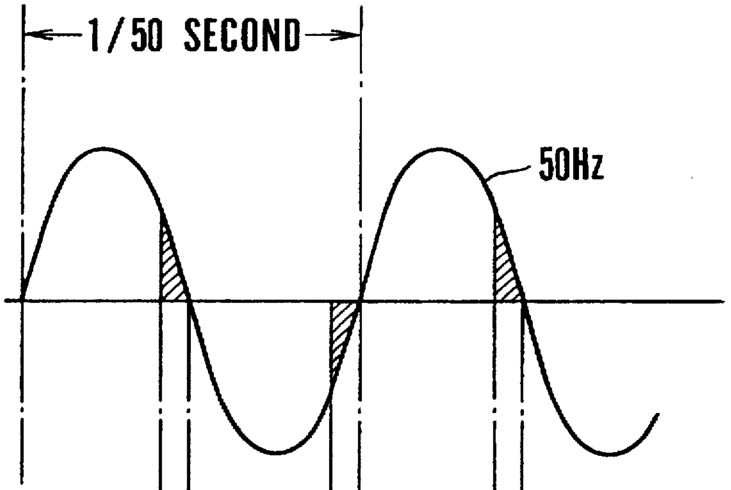
FIG. 9A shows a waveform of welding current and FIG. 9B shows diffusion bonding provided on the interface of the base material and the wire material.
Figure 9B:
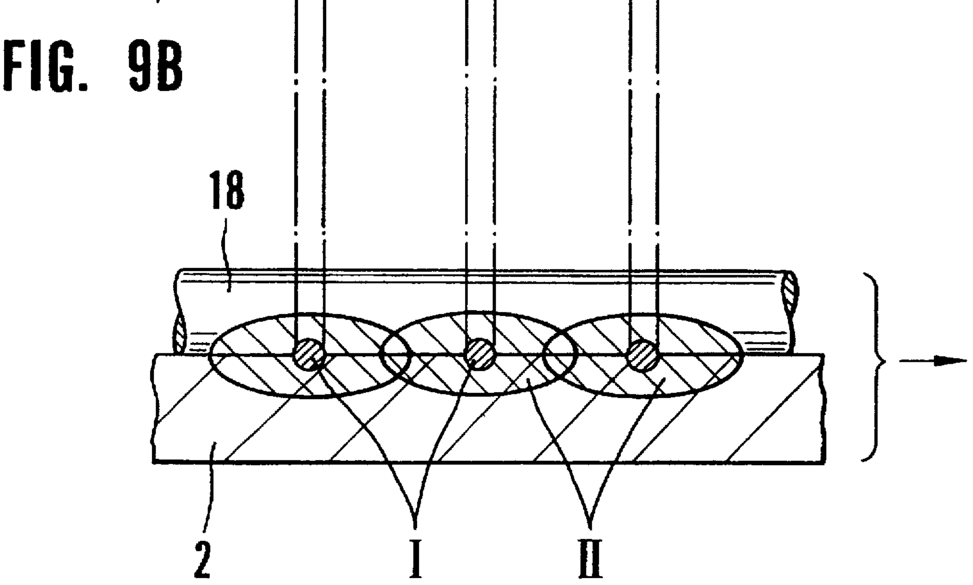
Figure 11:
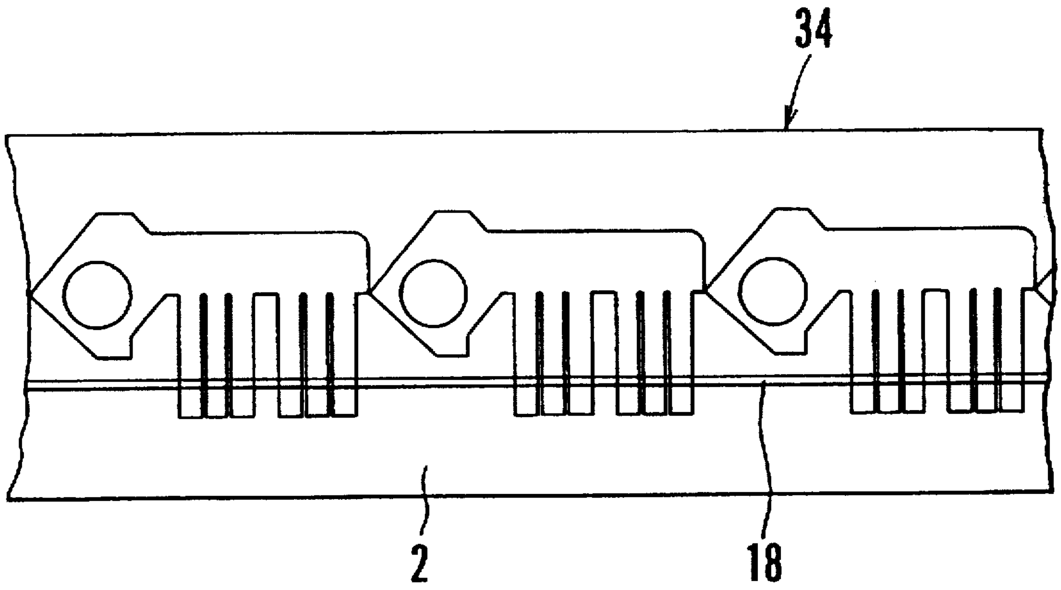
FIG. 11 shows the process of producing a contact part from a contact/connection member produced by the contact/connection member production apparatus of the present invention.

A welding current of a controlled level which is pulsed at fixed intervals of 0.01 to 7 seconds per frequency as hatched in FIG. 9A is supplied to the seam welding unit 25 from a positive terminal of the welding power supply head 27 through the variable rotation roller electrode 28, the contact/ connection member wire material 18 located in the recess 29 of the variable rotation roller electrode 28, the contact/connection member base material 2 and the mother rotation electrode 26 to a negative terminal of the welding power supply head 27. At this point, the contact/connection member wire material 18 retains its fusion temperature range or a solid-phase diffusion temperature range below the fusion temperature range during flowing of the welding current and a metal fusion bonding phenomenon or a metal solid-phase diffusion bonding phenomenon occurs at an interface contact region between parts of different materials, i.e., the contact/connection member wire material 18 and the contact/connection member base material 2. As a result, a pure melting diffusion bonding region I which is called a first nugget is produced in the interface contact region and then a firm bonding region II of melting diffusion and solid-phase diffusion which is called a second nugget is produced by affection of heat conduction based on the Joule's law as shown in FIG. 9B. Thereby, the base material 2 and the wire material 18 are bonded together without fail.

Conditions for electric resistance welding are adjusted depending upon the base material and the wire material. The contact/connection member wire material 18 and the contact/connection member base material 2 are continuously welded in their traveling direction while they are supplied by the variable rotation roller electrode 28 at a constant speed.

By adding a cooling unit such as an forced air cooling or circulating water cooling unit to the variable rotation roller electrode 28 and the mother rotation electrode 26, long-time continuous welding is made possible.

Figure 10:
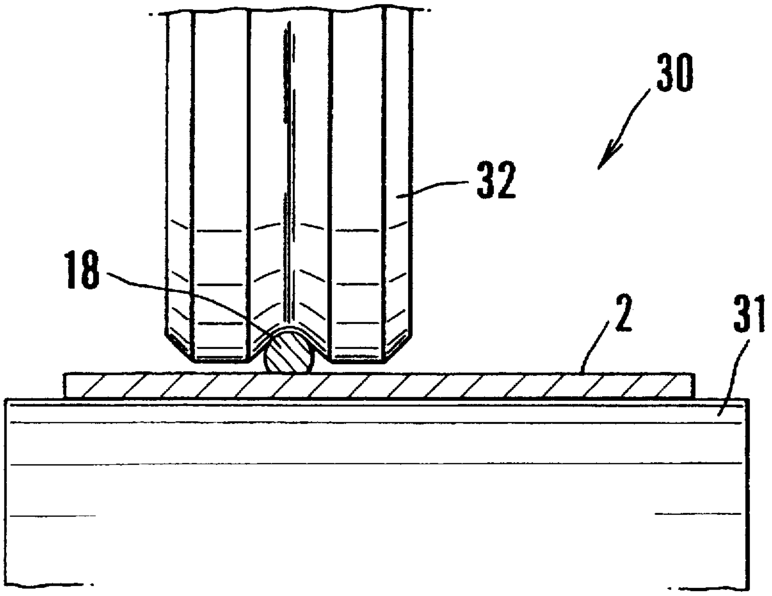
FIG. 10 shows a pressure section of the pressure unit of the first embodiment taken along the line 10—10 in FIG. 6.

Returning again to FIG. 1, reference numeral 30 represents a pressure unit installed downstream of and near the seam welding unit 25. This pressure unit 30, as shown in FIGS. 4 and 10, consists of a mother pressure rotation roller 31 for supporting the the contact/connection member base material 2 and a pressure roller 32 for molding into a predetermined shape the contact/connection member wire material 18 which is bonded to the contact/connection member base material 2 over the mother pressure rotation roller 31 and is heated.

Reference numeral 33 represents a contact/connection member take-up unit for winding a contact/connection member 34 for electric and electronic parts processed by the pressure unit 30. This contact/connection member take-up unit 33, as shown in FIG. 4, comprises rear horizontal positioning guide rollers 35 having the same structure as the horizontal positioning guide roller 16 and arranged at a downstream of the pressure unit 30, rear vertical positioning guide rollers 36, 36 and 36 arranged symmetrical to the vertical positioning guide rollers 12, 12 and 12 and arranged at a downstream of the rear horizontal positioning guide rollers 35, a take-up reel stand 39 for rotatably supporting a take-up reel 38 which is rotated by the motor 37 and around which the contact/connection member 34 is wound via insertion paper 3, an automatic contact/connection member winding stand 42 provided with sensors 41 and 41 for turning on and off the motor 37 and for controlling the winding of the contact/connection member 34 at upper and lower portions thereof and arranged between the take-up reel stand 39 and the rear vertical positioning guide rollers 36, 36 and 36, and an insertion paper supply reel 43 for supplying insertion paper 3 to the take-up reel 38, around which the insertion paper 3 is wound.

Reference numeral 44 denotes a clean chamber for covering a welding section of the seam welding unit 25 and a pressure section of the pressure unit 30. This clean chamber 44 is used in vacuum or a gas atmosphere of a nitrogen gas, a hydrogen and nitrogen mixture gas, or an inert gas such as argon.

Reference numeral 45 denotes a control board attached to a casing 46 for covering the vertical positioning guide rollers 12, 12 and 12, horizontal positioning guide rollers 16, seam welding unit 25, pressure unit 30, rear horizontal positioning guide rollers 35 and rear vertical positioning guide rollers 36.

In the apparatus 47 for producing a contact/connection member for electric and electronic parts having the above constitution, the contact/connection member base material 2 is supplied to the seam welding unit 25 by the contact/connection member base material supply unit 1 while it is positioned, the contact/connection member wire material 18 is also supplied to the seal welding unit 25 by the wire material supply unit 17 while it is positioned, the the contact/connection member wire material 18 is diffusion bonded to the contact/connection member base material 2 continuously by the seal welding unit 25, and the thus bonded materials are transferred to the pressure unit 30 which presses the diffusion bonded contact/connection member wire material 18 to mold it into a predetermined shape and wound around the take-up reel 38 of the contact/connection member take-up unit 33 via the insertion paper 3 while they are positioned.

The diffusion bonding position of the contact/connection member wire material 18 to be diffusion bonded to the contact/connection member base material 2 can be adjusted by controlling the horizontal positioning guide rollers 16 and 35 in the front and rear of the seam welding unit 25.

Figure 12:
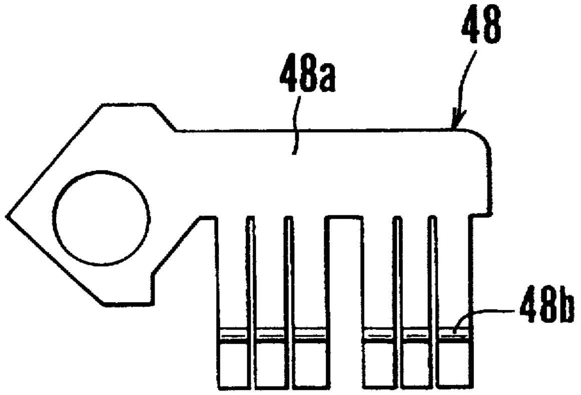
FIG. 12 shows an example of a processed contact part.

A contact 48 as shown in FIG. 12 can be produced by pressing the contact/connection member 34 produced as described above as shown in FIG. 11.

Similarly, fixed contacts for various types of connectors, fixed and semi-fixed contacts for various types of electric and electronic parts, various types of switch contacts, bimetal-precious metal contacts, brush contacts for micromotors, various types of multi-axis contacts, cermet trimmers, encoders, slot potentiometers and the like can be produced by pressing the contact/connection member 34.

A description is subsequently given of other embodiments of the present invention as shown from FIG. 13 to FIGS. 34A and 34B. Prior to the description of the different embodiments of the present invention, the same codes are given to the same or corresponding constituent elements as those of the first embodiment and their descriptions are omitted.

Figure 13:
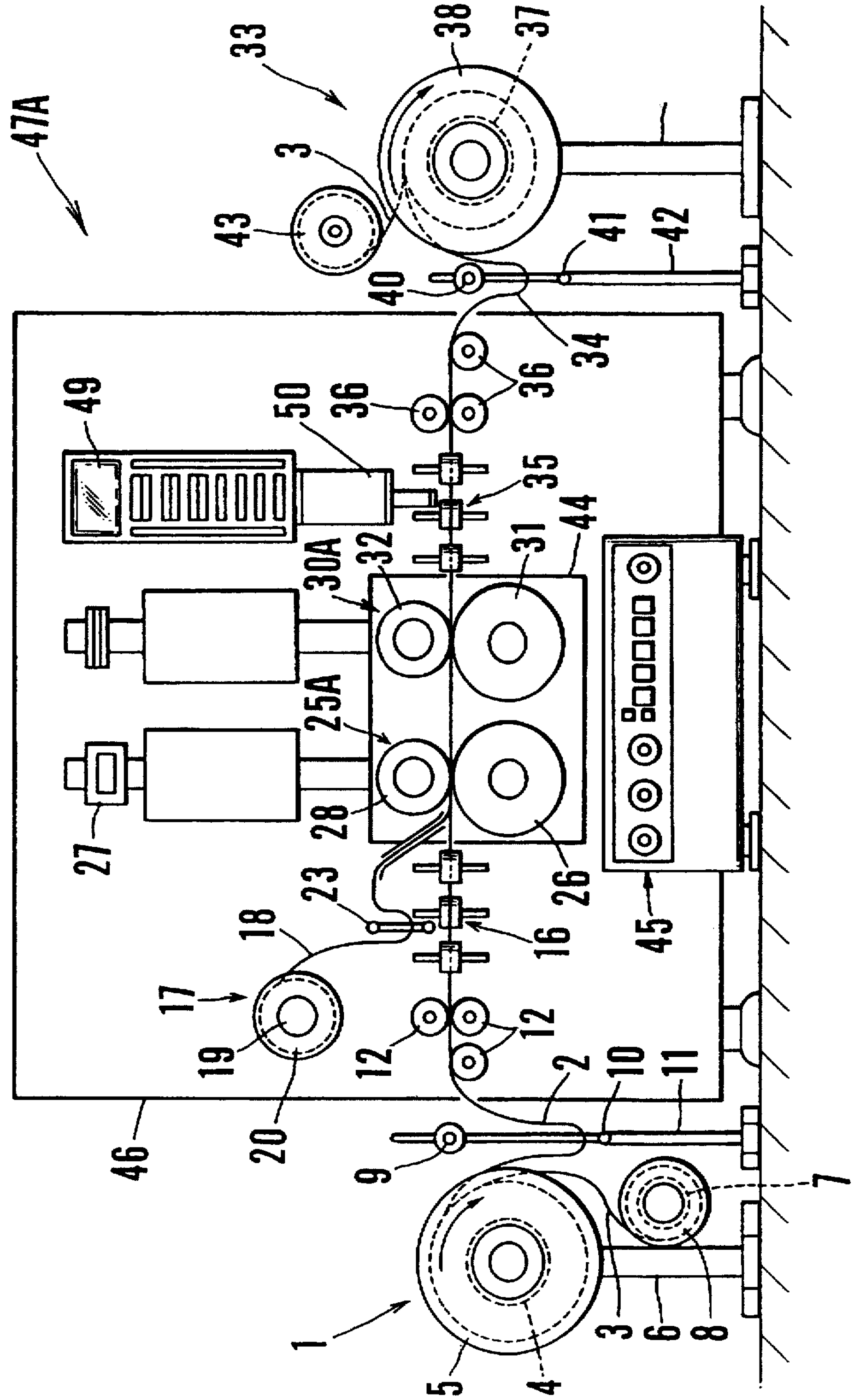
FIG. 13 is a schematic front view showing the entire configuration of a contact/connection member production apparatus according to a second embodiment of the present invention.
Figure 14:
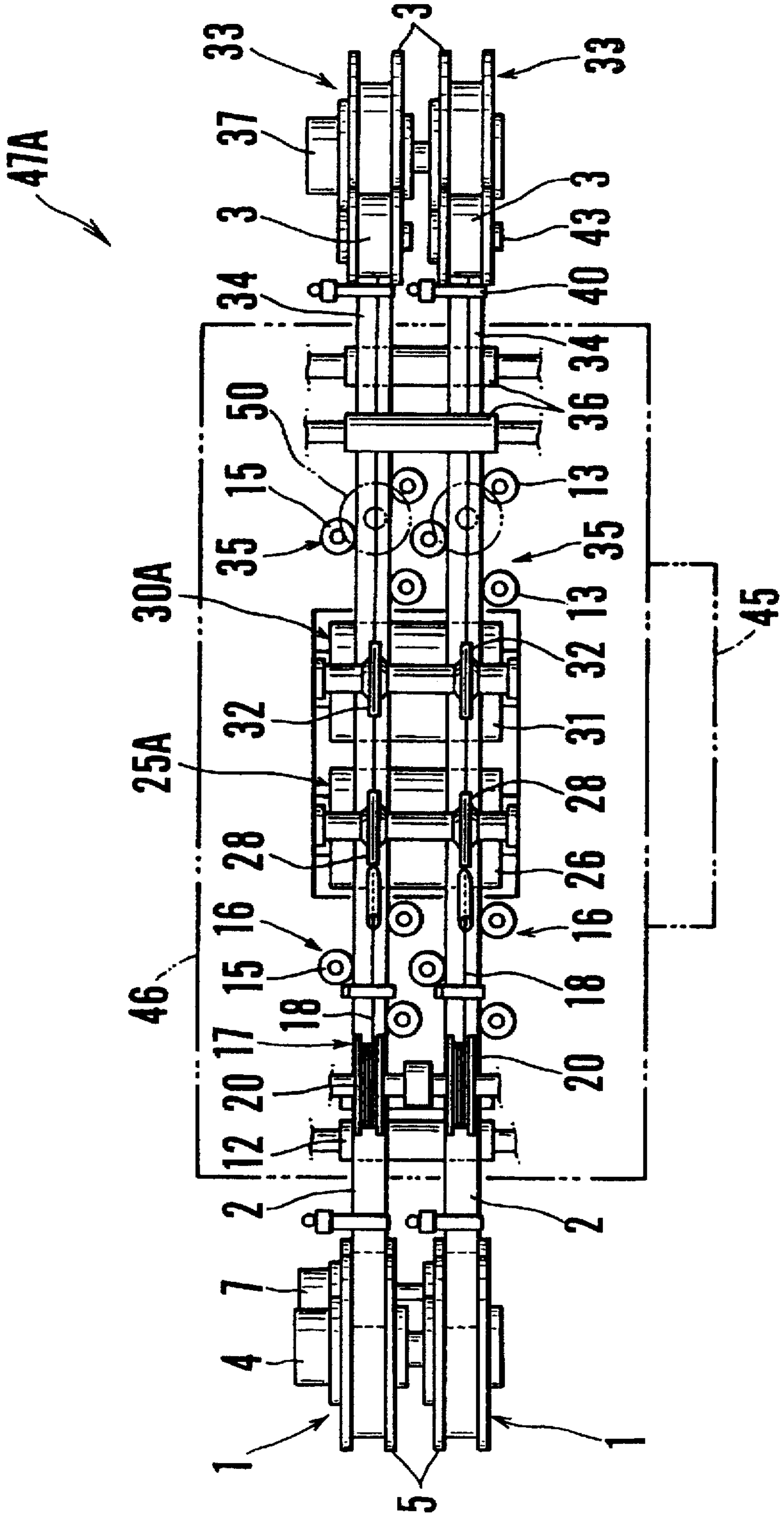
FIG. 14 is a schematic plan view of key parts of the contact/connection member production apparatus of FIG. 13.
Figure 15:
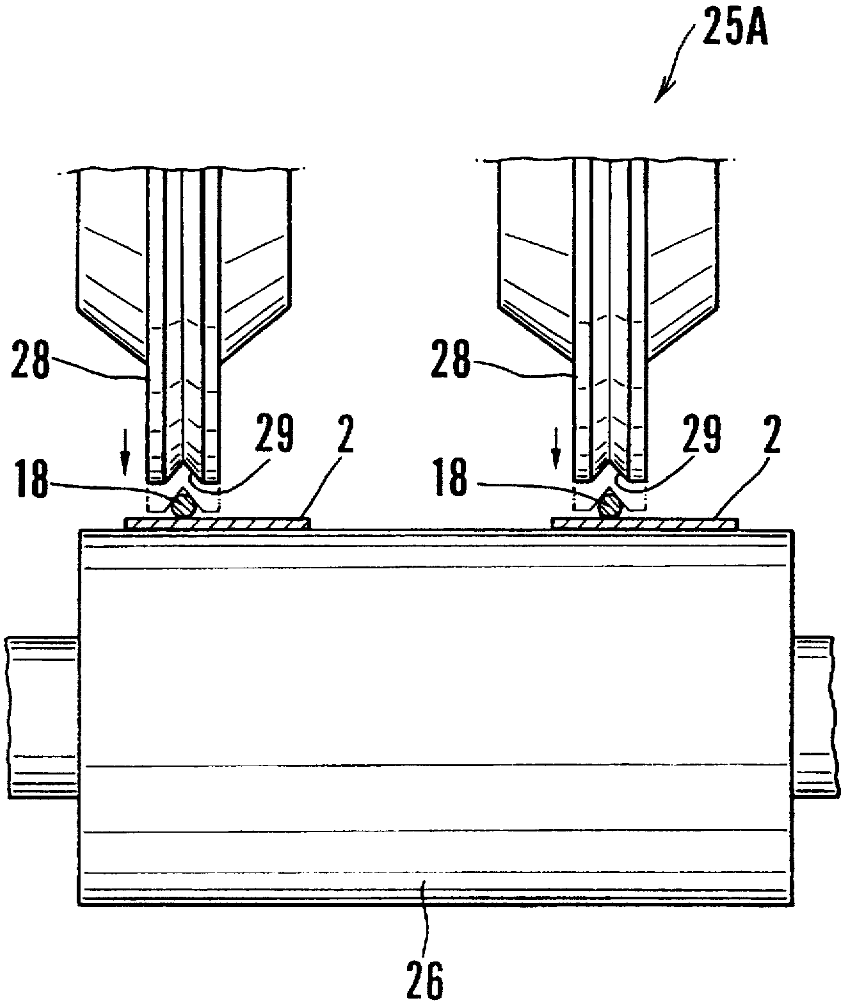
FIG. 15 shows a welding section of a seam welding unit of the second embodiment.

In the second embodiment of the present invention shown in FIG. 13 to FIG. 15, the main differences from the first embodiment are that two contact/connection member base material supply units 1 arranged in parallel, a seam welding unit 25A using a mother rotation electrode 26 for a combined use, a pressure unit 30A using a mother pressure rotation roller 31 for a combined use, and two contact/connection member take-up units 33 and 33 are arranged to produce two contact/connection members 34 and 34 simultaneously, and that a CCD two dimentional XY control sensor having a CCD monitor 49 is arranged at the position of the rear horizontal positioning guide rollers 35. The same function and effect as those of the first embodiment of the present invention can be obtained from the apparatus 47A for producing a contact/connection member for electric and electronic parts which is constituted as described above.

Figure 16:
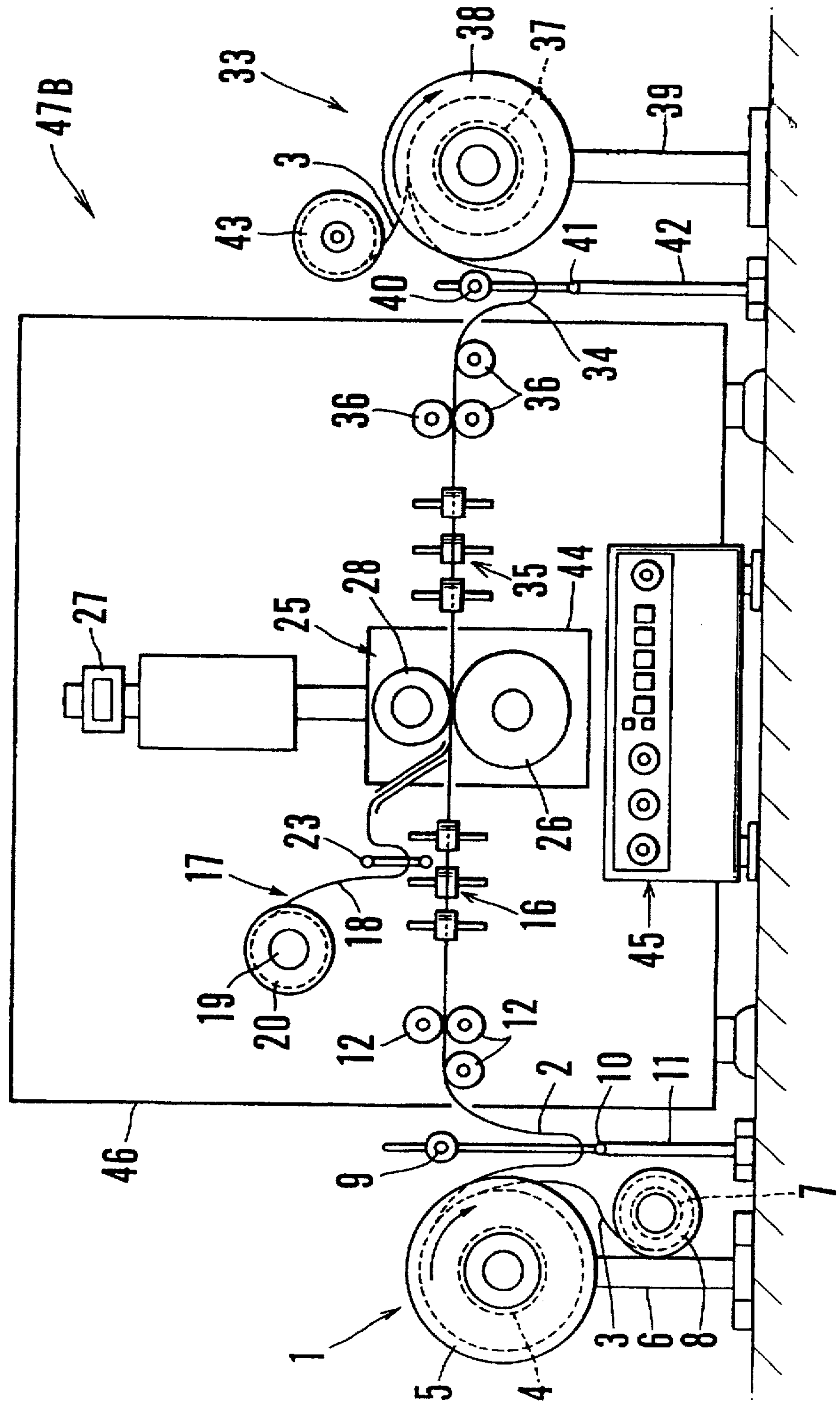
FIG. 16 is a schematic front view showing the entire configuration of a contact/connection member production apparatus according to a third embodiment of the present invention.
Figure 17:
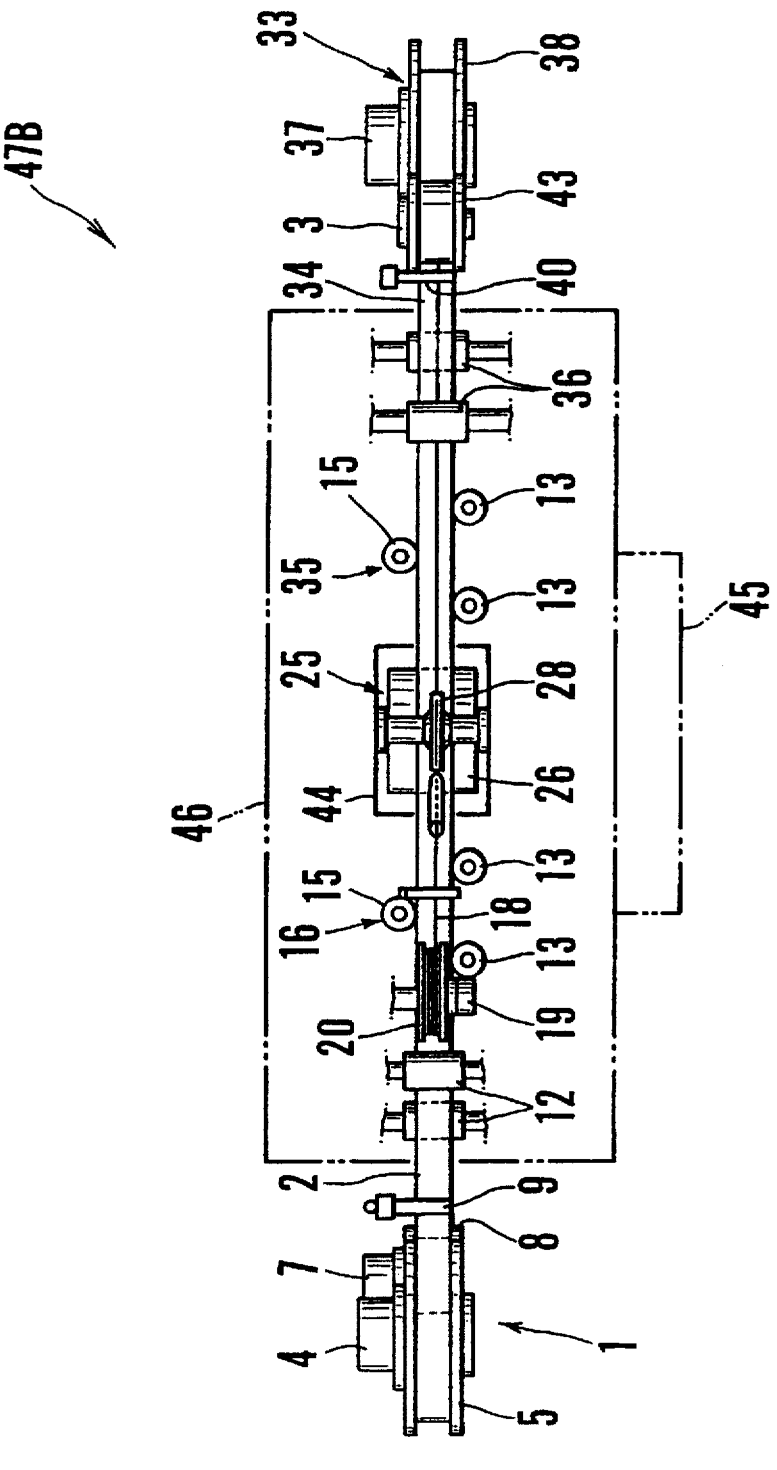
FIG. 17 is a schematic plan view of key parts of the contact/connection member production apparatus of FIG. 16.
Figure 18:
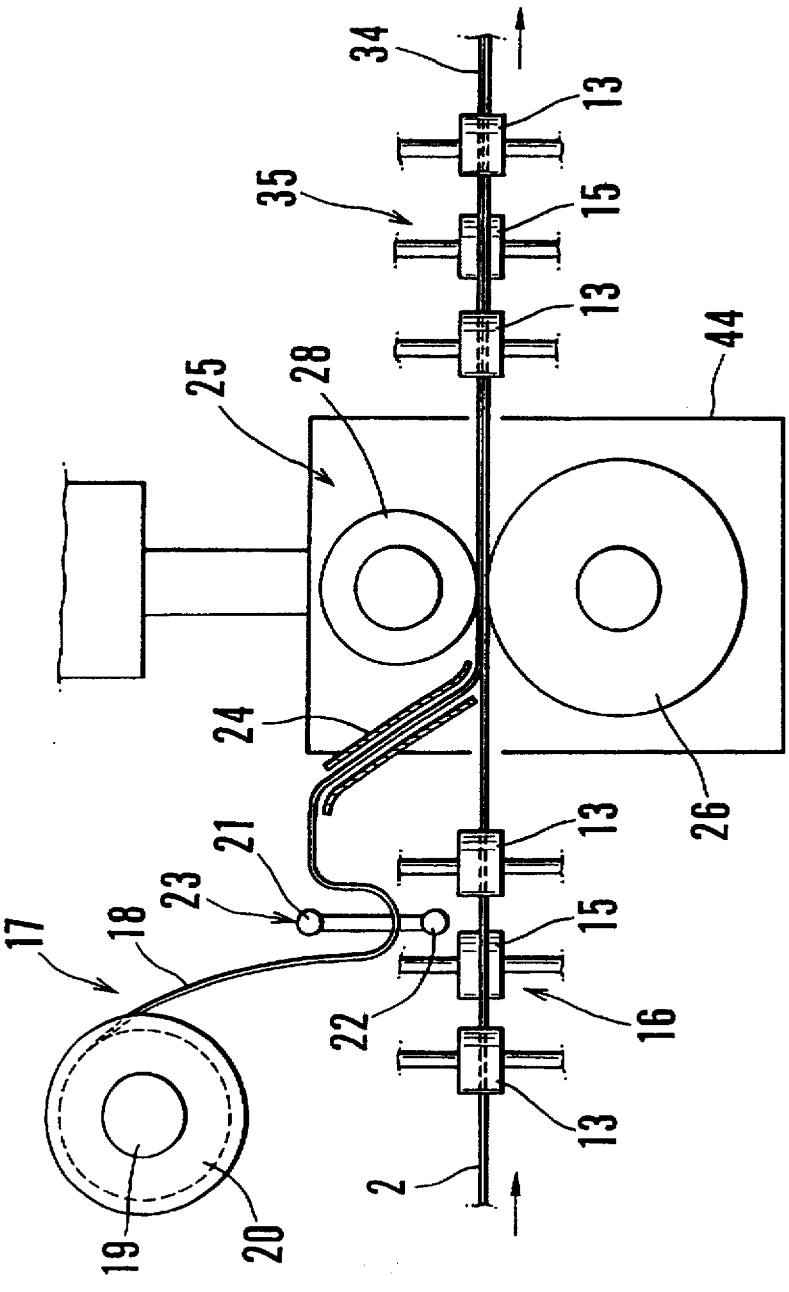
FIG. 18 is a schematic plan view of key parts including a welding unit of the third embodiment.

In the third embodiment of the present invention as shown in FIGS. 16 to 18, the main difference from the first embodiment of the present invention is that the contact/connection member 34 passing through the seam welding unit 25 is wound around the take-up reel 38 of the contact/connection member take-up unit 33. The same function and effect as those of the first embodiment of the present invention can be obtained from the apparatus 47B for producing a contact/connection member for electric and electronic parts which is constituted as described above.

Figure 19:
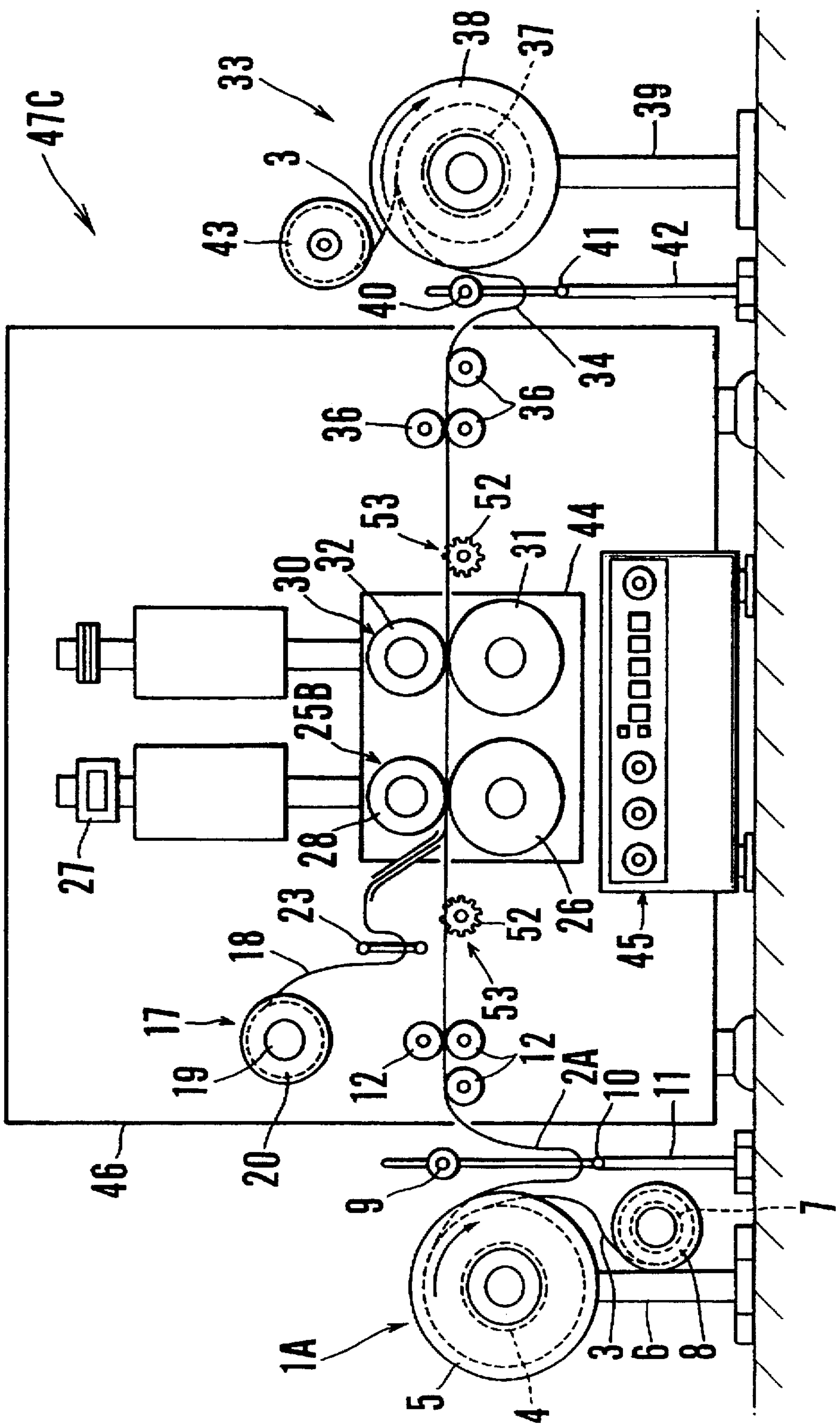
FIG. 19 is a schematic front view showing the entire configuration of a contact/connection member production apparatus according to a fourth embodiment of the present invention.
Figure 20:
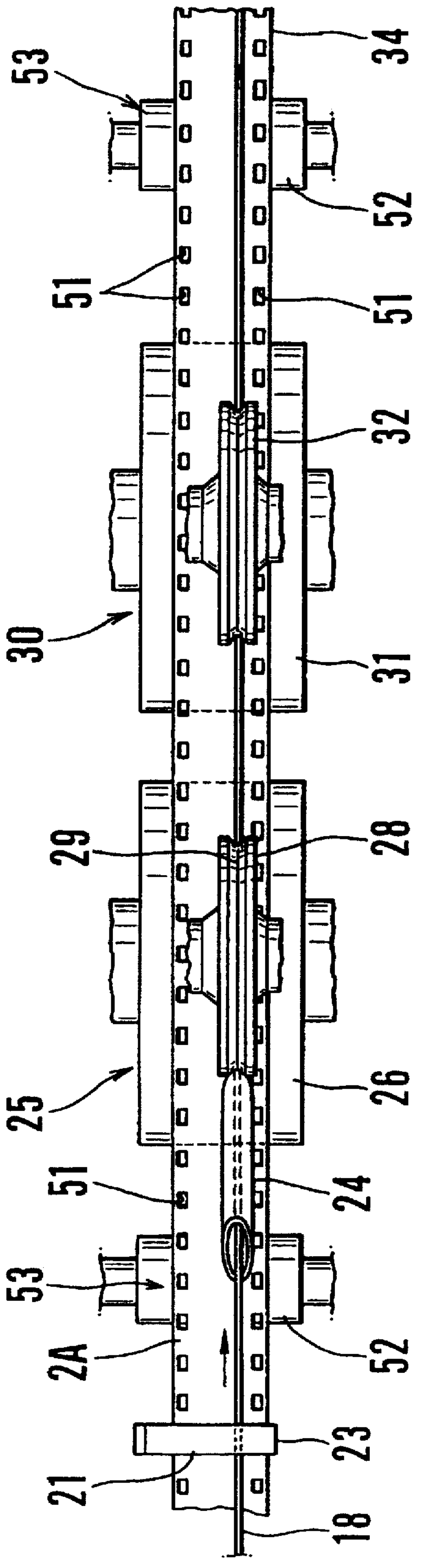
FIG. 20 is a schematic plan view of key parts of the contact/connection member production apparatus of FIG. 19.
Figure 21:
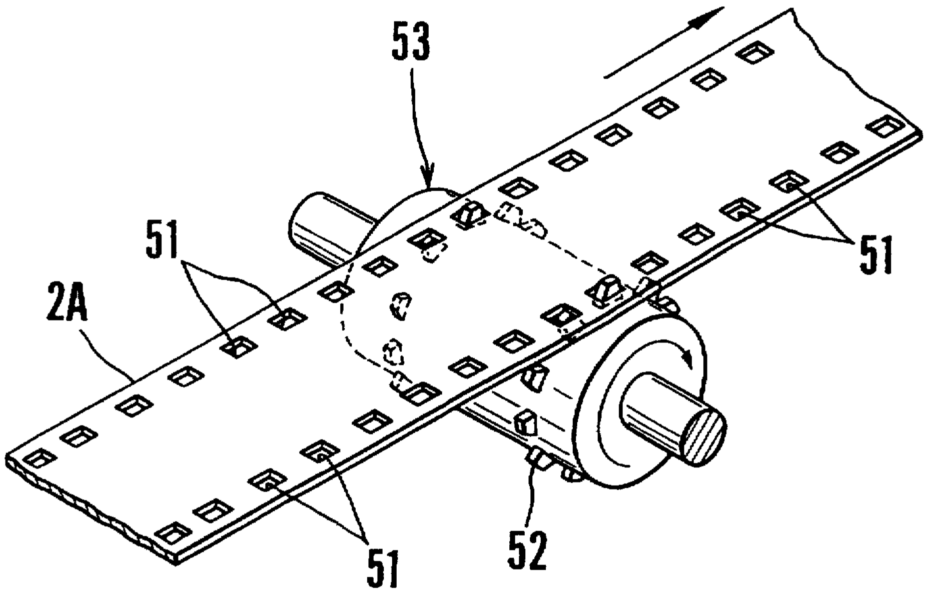
FIG. 21 is a perspective view of key parts of a contact/connection member base material supply unit of the fourth embodiment.

In the fourth embodiment of the present invention as shown in FIGS. 19 to 21, the main differences from the first embodiment of the present invention are that sprue holes 51 are formed in both sides or one side (both sides in this embodiment) of the contact/connection member base material 2A wound around the supply reel 5 of the contact/connection member base material supply unit 1A at predetermined intervals and that horizontal positioning guides 53 and 53 having sprue gears 52 and 52 which engage with the sprue holes 51 and 51 of the contact/connection member base material 2A are arranged in the front and rear of the seam welding unit 25B. The same function and effect as those of the first embodiment of the present invention can be obtained from the apparatus 47C for producing a contact/connection member for electric and electronic parts which is constituted as described above.

Figure 23:
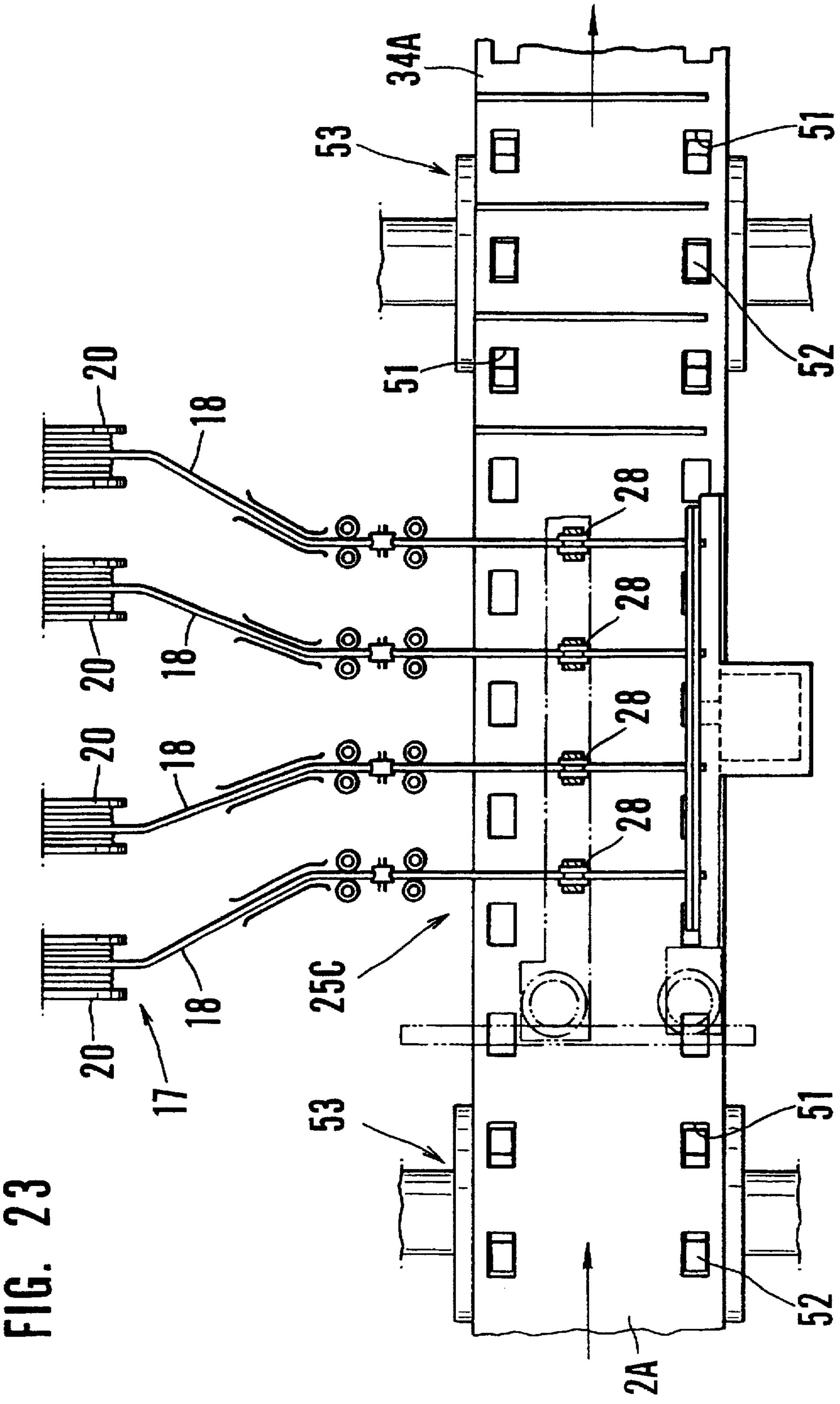
FIG. 23 is a schematic front view of key parts of the contact/connection member production apparatus of FIG. 22.
Figure 24:
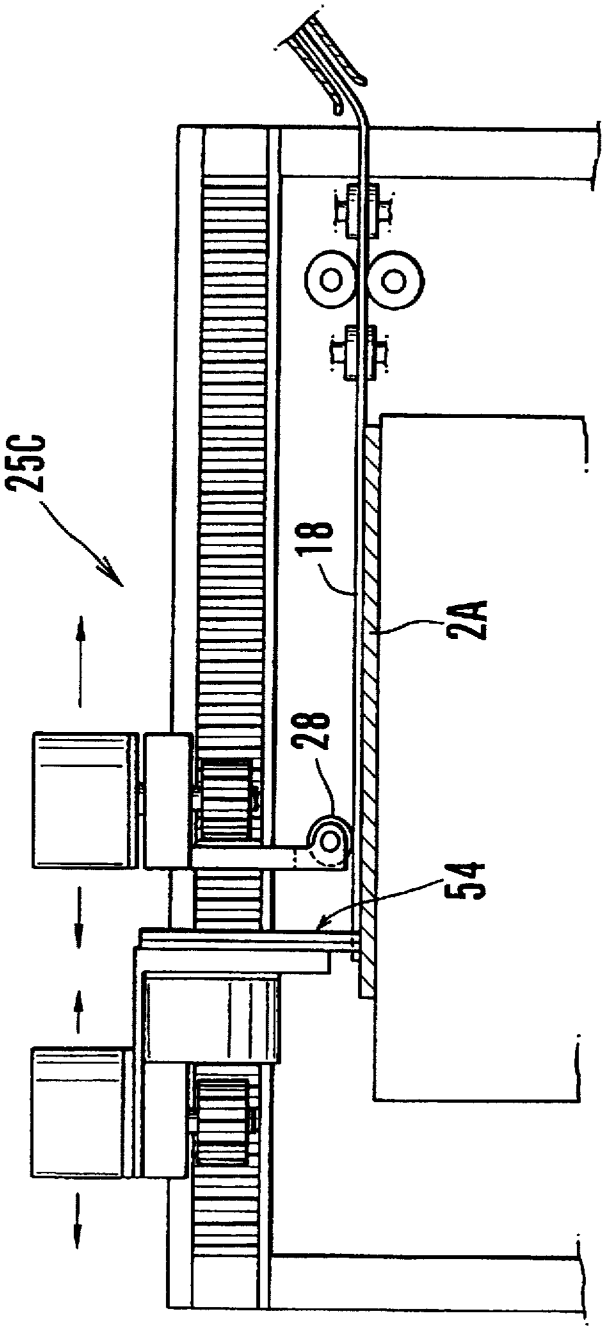
FIG. 24 is a schematic diagram of a seam welding unit of the fifth embodiment.
Figure 25:
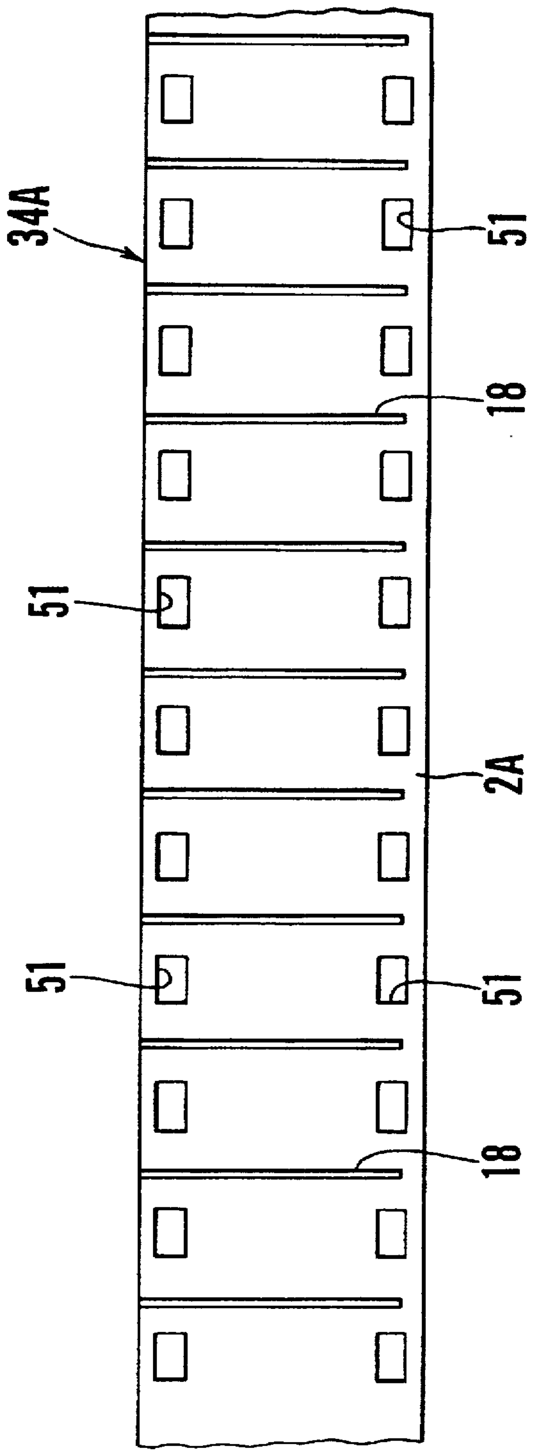
FIG. 25 is a diagram for explaining the production of a contact part from a contact/connection member produced by the apparatus of the fifth embodiment.

In the fifth embodiment of the present invention as shown in FIGS. 22 to 25, the main differences from the fourth embodiment of the present invention are that a contact/connection member base material supply unit 1B which can transfer a contact/connection member base material 2A intermittently and a contact/connection member take-up unit 33A are used, and that a seam welding unit 25C comprising a contact/connection member wire material positioning arm 54 for holding an end portion of the contact/connection member wire material 18 and placing it on the contact/connection member base material 2A at a predetermined location in a width direction of the contact/connection member base material 2A (a direction perpendicular to the contact/connection member base material 2A in this embodiment) is used. A contact/connection member 34A as shown in FIG. 25 can be obtained by the apparatus 47D for producing a contact/connection member for electric and electronic parts which is constituted as described above.

Figure 26:
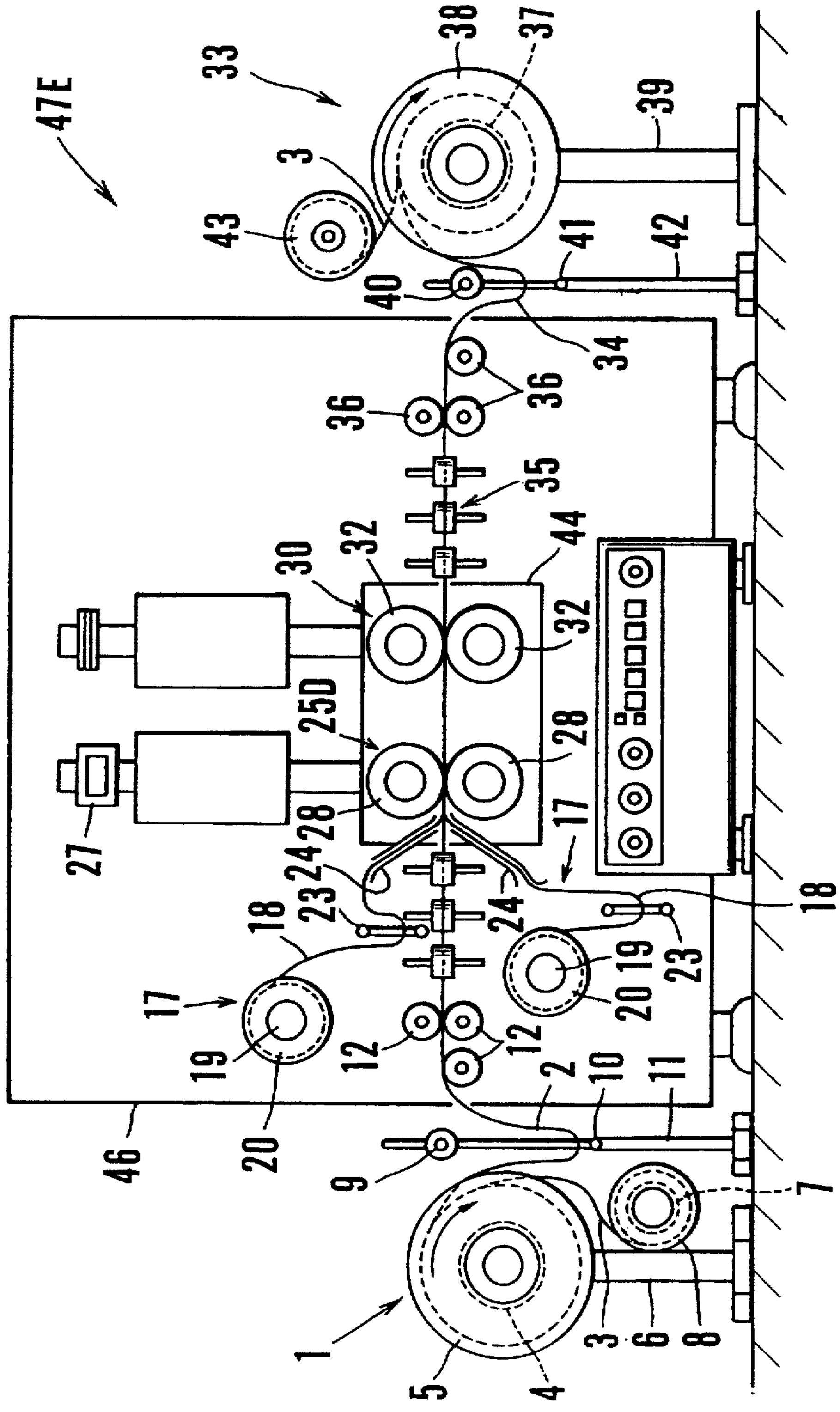
FIG. 26 is a schematic front view showing the entire configuration of a contact/connection member production apparatus according to a sixth embodiment of the present invention.
Figure 27:
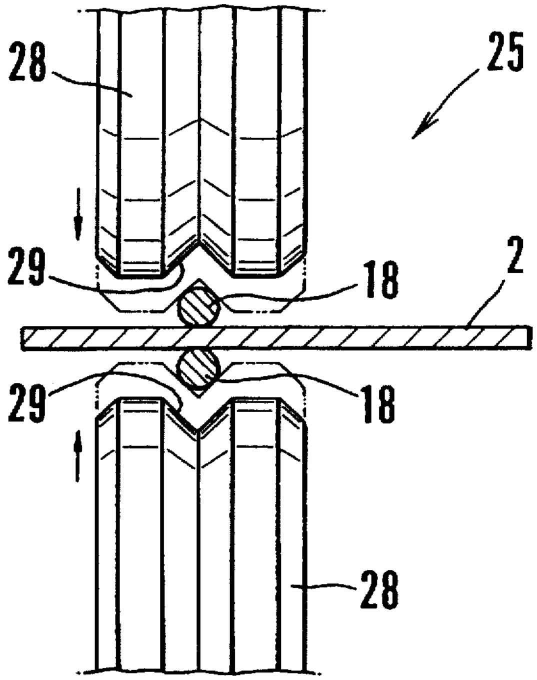
FIG. 27 shows a welding section of a seam welding unit of the sixth embodiment.
Figure 28:
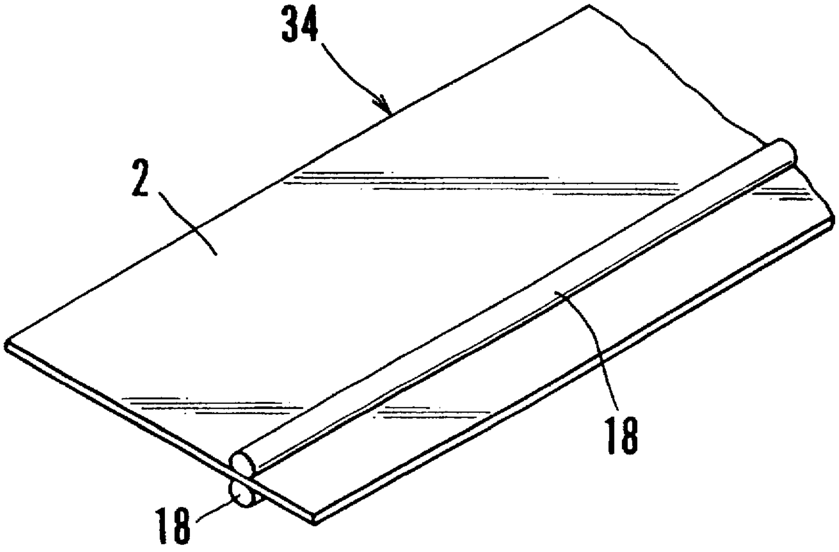
FIG. 28 is a perspective view of a contact/connection member produced by the apparatus of the sixth embodiment.

In the sixth embodiment of the present invention as shown in FIGS. 26 to 28, the main difference from the first embodiment of the present invention is that upper and lower contact/connection member wire material supply units 17 and 17 for supplying contact/connection member wire materials 18 and 18 wound around the supply reels 5 and 5 over the front and rear surfaces of the contact/connection member base material 2 from the contact/connection member base material supply unit 1 through guide nozzles 24 and 24 and a seam welding unit 25D which consists of a pair of variable rotation roller electrodes 28 and 28 for pressing the contact/connection member wire materials 18 and 18 and the contact/connection member base material 2 so that the the contact/connection member wire materials 18 and 18 can be diffusion bonded to the contact/connection member base material 2 while the contact/connection member wire materials 18 and 18 are placed on the front and rear surfaces of the contact/connection member base material 2 by the upper and lower contact/connection member wire material supply units 17 and 17 are used. The same function and effect as those of the first embodiment of the present invention can be obtained from the apparatus 47E for producing a contact/connection member for electric and electronic parts which is constituted as described above and a contact/connection member 34B as shown in FIG. 33 in which the contact/connection member wire materials 18 and 18 are diffusion bonded to the front and rear surfaces of the contact/connection member base material 2 can be produced.

In this embodiment, to diffusion bond the contact/connection member wire materials 18 and 18 to the front and rear surfaces of the contact/connection member base material 2, the contact/connection member wire materials 18 and 18 for the front and rear surfaces having the same diffusion bonding conditions, for example, the contact/connection member wire materials 18 and 18 of the same material and in the same volume are used.

To diffusion bond the contact/connection member wire materials 18 and 18 which cannot be diffusion bonded under the same conditions to the front and rear surfaces of the contact/connection member base material 2, the contact/connection member base material 2 is caused to pass through the apparatus 47 for producing a contact/connection member for electric and electronic parts of the first embodiment of the present invention twice, thereby making it possible to produce a contact/connection member 34 in which the contact/connection member wire materials 18 and 18 are diffusion bonded to the front and rear surfaces of the contact/connection member base material 2.

Figure 29:
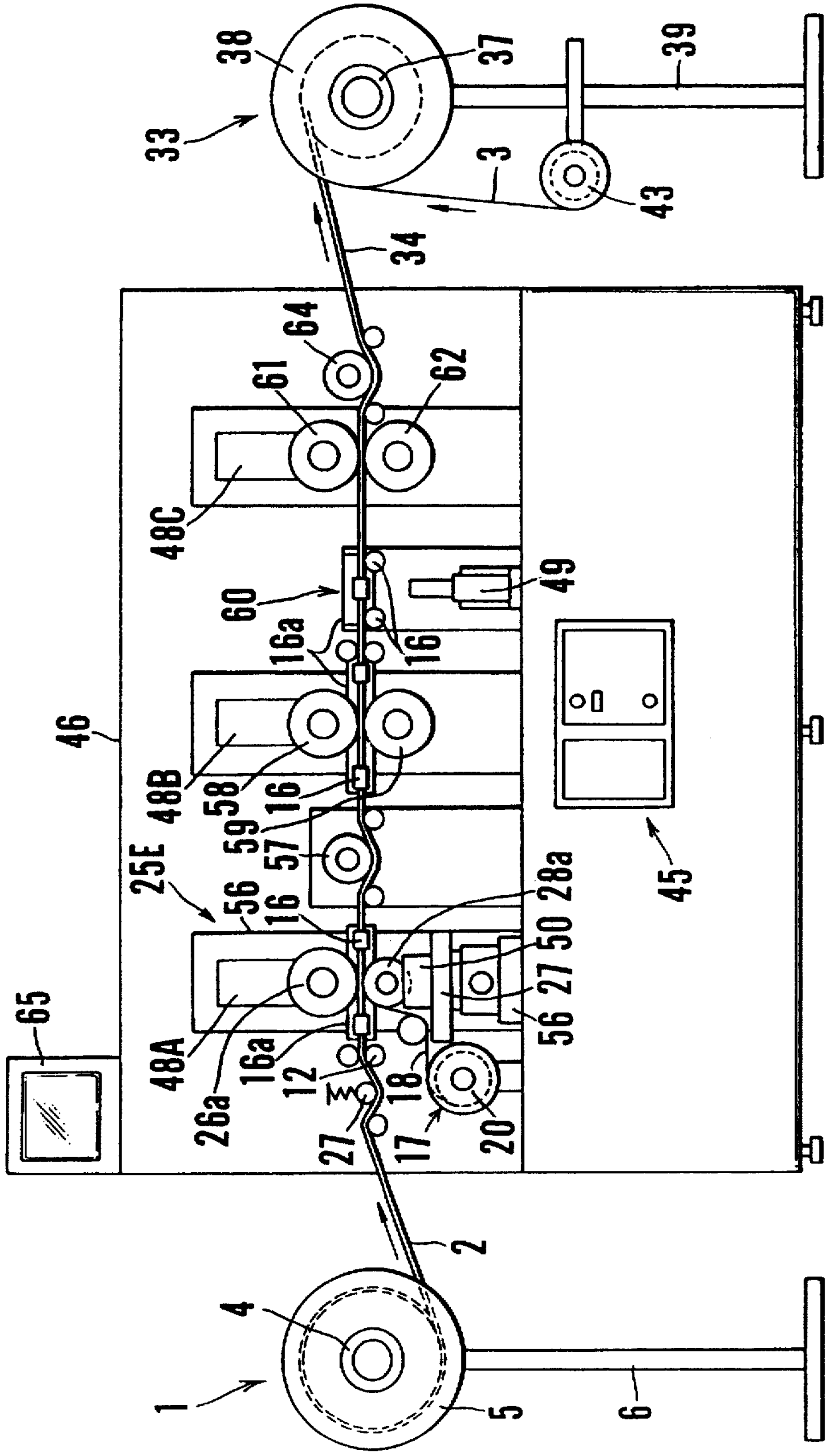
FIG. 29 is a schematic front view showing the entire configuration of a contact/connection member production apparatus according to a seventh embodiment of the present invention.

FIG. 29 is a schematic front view showing the entire configuration of a contact/connection member production apparatus according to a seventh embodiment of the present invention. The same reference numerals are given to the same or corresponding constituent elements as those of the previous embodiments.

Figure 30:
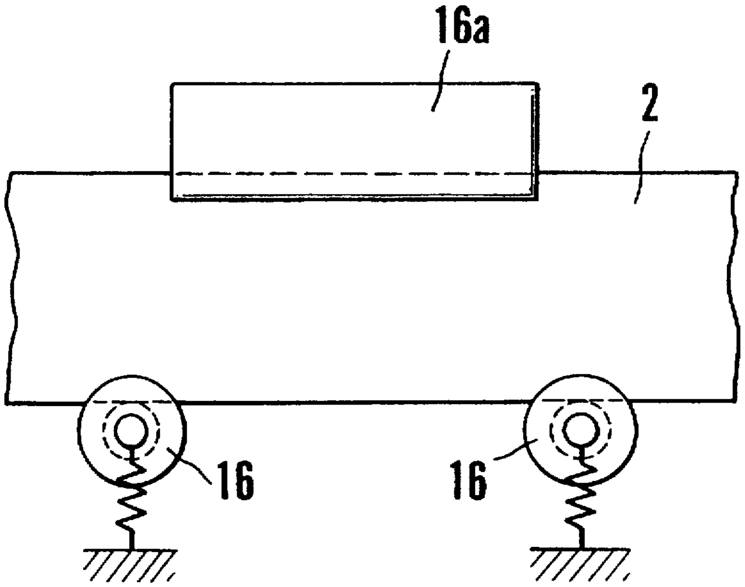
FIG. 30 shows the position of guide rollers for positioning a contact/connection member base material in a horizontal direction in the seventh embodiment.

Reference numeral 1 represents a contact/connection member base material supply unit for supplying a contact/connection member base material which is a base metal material as a material of a contact/connection member. The contact/connection member base material 2 is wound around the supply reel 5 and is supplied from the supply reel 5 by the rotation of the motor 4 supported by the stand 6. Along the supply route of the contact/connection member base material 2, there are arranged a tension roller 27, urged by a spring, for giving tension to the base material 2 and a plurality of positioning guide rollers 12 and 16 for positioning the base material 2 in a vertical direction and a horizontal direction. A pair of the guide rollers 16 for positioning in a horizontal direction, as shown in FIG. 30, are arranged at one side edge of the base material 2 and urges a reference block 16*a* arranged at the opposite side edge of the base material 2 by a spring to limit the position of the base material 2 in a horizontal direction. A groove for receiving the base material 2 is formed in the side surface of the guide rollers 16 and the reference block 16*a* so that the side edges of the base material 2 enter the grooves. The reference block 16*a* is made of industrial ruby, industrial sapphire or super hard alloy such as tungsten cemented carbide.

The contact/connection member base material 2 is a belt-shaped continuous long material having a thickness of 0.03 to 3.0 mm and a width of 3.0 to 300 mm, which is selected from among phosphor bronze, german silver, 42 Alloy, covar, austenite stainless steel, ferrite stainless steel, martensite stainless steel, brass, copper-nickel alloy, copper-beryllium alloy, copper, copper alloy, iron, iron alloy, magnetic materials, laminate materials consisting of non-ferrous materials and ferrous materials, laminate materials consisting of base metals and precious metals, bonded materials consisting of non-ferrous or ferrous metals and polymer films, and the like.

Reference numeral 17 represents a contact/connection member wire material supply unit for supplying a contact/ connection member wire material to be fused on the contact/connection member base material 2. The contact/connection member wire material 18 is supplied from below the contact/connection member base material 2 to a welding position by the rotation of a motor (not shown) from the supply reel 20. The contact/connection member wire material 18 is a linear material having a diameter of 0.03 to 3.00 mm, a stripe-shaped material measuring 0.03×0.06 mm to 3.0 to 3.0 mm, a shell-shaped material measuring 0.03×0.08 mm to 2.0×3.0 mm, or a hoop-shaped material measuring 0.01 to 0.50 mm to 1.0 to 10.0 mm and is selected from among gold, gold alloys, platinum, platinum alloys, silver, silver alloys, palladium, palladium alloys, three-element precious metal alloys, four-element precious metal alloys, five-element precious metal alloys, six-element precious metal alloys, seven-element precious metal alloys, multi-element precious metal alloys and the like.

Reference numeral 25E denotes a seam welding unit for fusing and fixing the contact/connection member wire material 18 to the contact/connection member base material 2 by diffusion bonding. The seam welding unit 25 consists of a mother rotation electrode 26a and a variable rotation roller electrode 28a which are arranged at upper and lower positions to sandwich the base material 2 and the wire material 18 therebetween in a vertical direction, respectively. The mother rotation electrode 26a is pressed downward by a deadweight pressure head 48A arranged above the electrode 26a and a cooling spiral pipe is provided inside the electrode roller.

Figure 31:
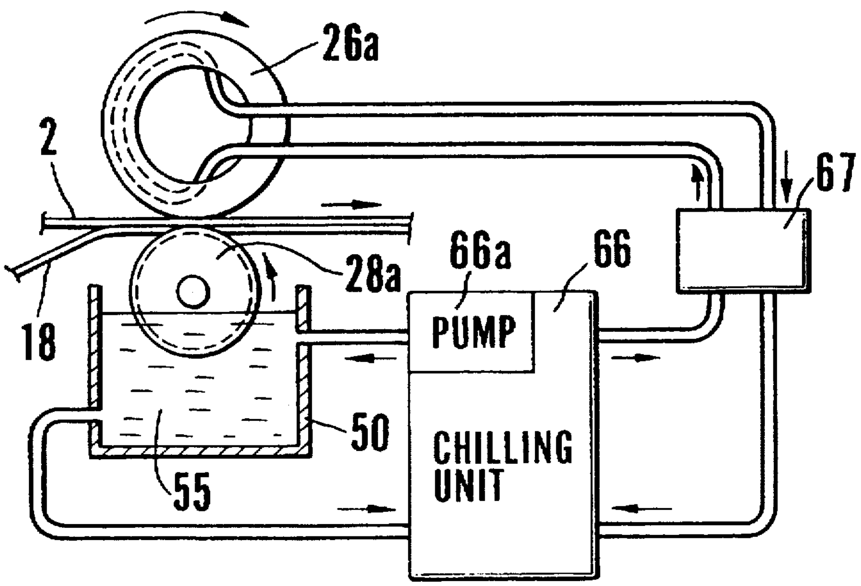
FIG. 31 is an enlarged view of a cooling unit for a welding unit of the contact/connection member production apparatus of the seventh embodiment shown in FIG. 30.

As shown in FIG. 31 which is an enlarged view of a welding section, a cooling tank 50 is provided right below the variable rotation roller electrode 28a which is rotated with part thereof immersed in cooing water 55 in the cooling tank 50. The cooling tank 50 is connected with a chilling unit 66 by a pipe and cooling water (for example, cooled at 15° C.) is always circulated by a pump housed in the chilling unit 66 during the operation of the contact/connection member production apparatus. Cooling water is circulated in the cooling spiral pipe for the mother rotation electrode 26a from the chilling unit 66 by a forced circulation pump 67. The variable rotation roller electrode 28a lies on the positioning table 56 which is position controlled by a two dimentional XY controller using a CCD to be described hereinafter so that the position of the variable rotation roller electrode 28a can be finely adjusted.

A V-shaped groove (28-1) (a V angle of about 90°) for positioning and guiding the contact/connection member wire material 18 is formed in the front surface of the variable rotation roller electrode 28a as shown in FIG. 32.

The seam welding unit 25 is provided with a welding power supply head 27 for supplying a welding current to the variable rotation roller electrode 28a. The welding current is a pulse current which flows for a predetermined short time of 0.01 to 7 seconds per frequency and generated by an oscillator inside the welding power supply head 27.

The seam welding unit 25 is encased in a clean chamber 46 which is in vacuum or an atmosphere of a nitrogen gas, a nitrogen and hydrogen mixture gas, or an inert gas such as argon.

Downstream of the seam welding unit 25E, there is arranged a pinch roller 57 for driving the contact/connection member base material 2 at a constant speed.

Downstream of the pinch roller 57, there are provided a pair of levelling rollers 58 and 59 for removing a warp in a width direction of the contact/connection member base material 2 generated in the welding section. As shown in FIG. 33, the upper roller 58 is a barrel-shaped roller whose diameter is the maximum at a position a little right to the center (corresponding to a location where the contact/connection member wire material 18 is fused on the contact/connection member base material 2) and decreases toward both ends thereof and which is made of dice steel, high-speed steel or other super hard material having an Rockwell Hardness (C-Scale) HRc of 65 or more, such as tungsten carbide or titanium carbide. The lower roller 59 is a hand drum-like roller having a groove 59a formed therein and having such a section that the contact/connection member wire material 18 can fit in the groove 59a at a location where the diameter of the upper roller 58 is the maximum. Above the upper roller 58, there is provided a deadweight type pressure head 48B for pressing the upper roller 58 downward.

Downstream of the levelling rollers 58 and 59, there is provided a welding position monitoring unit 60 which uses a CCD camera 49. The contact/connection member wire material 18 which is fused on the contact/connection member base material 2 is photographed with the CCD camera 49 and its image information is transmitted to a two dimentional XY controller to be described hereinafter.

Downstream of the welding position monitoring unit 60, there are arranged a pair of flattening roller 61 and 62 for slightly flattening a head portion of the contact/connection member wire material 18 fused on the contact/connection member base material 2 while it is still hot and molding it into a predetermined shape having a round section. These rollers 61 and 62 are made of a heat-resisting cemented carbide materials having Rockwell Hardness (C-Scale) 60 or more such as for example tungsten cemented carbide. The upper flattening roller 61 is provided with a deadweight type pressure head 48C for applying downward pressure like the levelling roller 58. Reference numeral 64 represents an auxiliary drive roller provided at a downstream of the levelling rollers 61 and 62.

Reference numeral 33 denotes a contact/connection member take-up unit for winding a belt-shaped contact/connection member 34 produced through the above process. The contact/connection member 34 is wound around a take-up reel 38 by a motor 37 supported by a stand 39. During winding the contact/connection member 34, insertion paper 3 supplied from an insertion paper supply reel 43 is inserted between the layers of the contact/connection member 34.

Out of the constituent elements described above, elements excluding the contact/connection member base material supply unit 1 and the contact/connection member take-up unit 33 are all housed in a casing 46. A control board 45 is installed on the front panel of the casing 46 and a check monitor 65 is installed on the top of the casing 46. The control board 45 is provided with an operation switch for turning on and off the contact/connection member production apparatus, an operation switch for setting and shifting welding conditions, a display for displaying the operation state of each element of the apparatus (such as supply speeds of the contact/connection member base material and the contact/connection member wire material, the temperature of the welding electrode, and pressure applied by the deadweight type pressure head 48C), a control knob for the two dimentional XY controller, an emergency button and the like. The position of the contact/connection member wire material 18 fused on the contact/connection member base material 2 is enlarged in the micron order and displayed on the LCD of the check monitor 65 based on a signal from the welding position monitoring unit 60.

A description is subsequently given of the production of a contact/connection member with the contact/connection member production apparatus of the present invention.

Prior to the operation of the apparatus, the contact/connection member base material 2 is wound around the supply reel 5 of the contact/connection member base material supply unit 1 and the contact/connection member wire material 18 is wound around the supply reel 20 of the contact/connection member wire material supply unit 17. Cooling water is circulated between the cooling tank 50 for the variable rotation roller electrode 27*a* and the chilling unit 56.

The deadweight type pressure heads 48A, 48B and 48C and the rollers provided along the supply route of the contact/connection member base material and wire material are first raised. Thereby, the mother rotation electrode 26*a* of the seam welding unit 25 is raised and a gap is formed between the variable rotation roller electrode 28*a* and the mother rotation electrode 26*a*. Then the contact/connection member wire material 18 is drawn from the supply reel 20, guided to the welding position over the rollers and set in the V-shaped groove (28-1) of the variable rotation roller electrode 28*a*. Thereafter, the contact/connection member base material 2 is drawn from the supply reel 5, guided to the welding position over the tension roller 27 and the positioning rollers 12 and 16, caused to pass between the mother rotation electrode 26*a* and the variable rotation roller electrode 28*a* in such a manner that the previously guided the contact/connection member wire material 18 is placed on the rear surface of the base material 2, and set in the take-up reel 38 of the take-up unit 33*c* after passing over some guide rollers and the pinch roller 57, between the levelling rollers 58 and 59, between the flattening rollers 61 and 62, and over the auxiliary drive roller 64. At this time, insertion paper 3 is drawn from the insertion paper supply reel 43, placed upon the contact/connection member base material 2 and set on the take-up reel 38.

Thereafter, the deadweight type pressure heads 48A, 48B and 48C and the rollers provided along the supply route of the contact/connection member base material and wire material are lowered. Thereby, the mother rotation electrode 26*a* and the variable rotation roller electrode 28*a* of the seam welding unit 25E are brought into contact with each other.

After the above preparation has been made, a welding current lower than usual is applied from the welding power supply head 27 to the variable rotation roller electrode 28*a*, and the motors 34 and 37 and the auxiliary drive roller 64 are rotated at a speed lower than usual to make a trial run by conveying the contact/connection member base material 2 and the contact/connection member wire material 18. At this point, the welding position is photographed with the CCD camera 49 and its image is displayed on the check monitor 65 to check it visually. When it is confirmed that the contact/connection member wire material 18 is fused on the contact/connection member base material 2 at a predetermined position, the welding current and the conveyance speeds of the base material and the wire material are raised to normal values to switch on an automatic operation mode.

In the automatic operation mode, a pulse welding current is supplied from the welding power supply head 27 to the variable rotation roller electrode 28*a* while the contact/connection member base material 2 and the contact/connection member wire material 18 are supplied to the seam welding unit 25E at the same constant speed (1 to 30 mm/sec.). Therefore, the fusion temperature range or the solid-phase diffusion temperature range below the fusion temperature range is maintained only for a period of 0.01 to 7 seconds during which the welding current is supplied, and a metal fusion bonding phenomenon or a metal solid-phase diffusion bonding phenomenon occurs at an interface contact region between different materials, i.e., the wire material 18 and the base material 2 affected by Joule heat, with the result that both materials are bonded together without fail. Since the contact/connection member base material 2 and the contact/connection member wire material 18 are supplied continuously, the contact/connection member wire material 18 is continuously fused on a predetermined position of the rear surface of the the contact/connection member base material 2. Dislocation of the welding position can be eliminated by finely adjusting the position of the positioning table 56 of the variable rotation roller electrode 28*a* by manually operating the control board 45 while an operator is looking at the check monitor 65 or by automatically controlling the positioning table 56 so that the displacement from the design value is corrected by analyzing image information from the welding position monitoring unit 60 using the CCD camera 49.

Since the variable rotation roller electrode 28*a* is rotated during this welding process while a part of it is immersed in the cooling water 55 of the cooling tank 50, it is considered that Joule heat generated at the welding position by the welding current is absorbed by this cooling water right after it is used for fusion and rarely raises the temperature of the variable rotation roller electrode 28*a*. Therefore, the displacement of the welding position caused by the difference of linear expansion coefficient between the contact/connection member base material 2 and the contact/connection member wire material 18 rarely occurs and a contact/connection member having high welding position accuracy can be obtained. According to experiments conducted by the inventors, when the cooling tank 50 was not provided, the temperature of the variable rotation roller electrode 28*a* was 90° C. whereas when the cooling tank 50 was provided and cooling water cooled at less than 20° C. was used, the temperature of the electrode could be reduced 20° C. to 25° C. As the result, allowable error could be reduced to about ±0.015 mm for a given allowable error of ±0.02 mm whereas allowable error will reach ±0.085 mm at the temperature of 90° C. without cooling. Contact/connection member in which the contact/connection member wire material 18 is fused on the the contact/connection member base material 2 in the seam welding unit 25E is liable to be elastically deformed as shown in FIG. 33. When the thus elastically deformed contact/connection member is caused to pass between the pair of levelling rollers 58 and 59 provided at a downstream of the welding unit 25, a flat contact/connection member which has been reformed by plastic deformation can be obtained. In this case, a pressure of 1 to 30 kg is applied to the upper levelling roller 58 by the deadweight type pressure head 48B.

The thus levelled contact/connection member 34 is monitored for its fused portion with the CCD camera 49 and caused to pass between the pair of flattening rollers 61 and 62. The section of the contact/connection member wire material 18 fused on the contact/connection member base material 2 becomes slightly sharp at the center thereof, as shown in FIG. 34A, due to the shape of the V-shaped groove (28-1) of the variable rotation roller electrode 28*a*. However, when it passes between the flattening rollers 61 and 62, a head portion of the contact/connection member wire material 18 is slightly pressed down and becomes round as shown in FIG. 34B because a pressure of 1 to 30 kg is applied to the upper roller 61 by the deadweight type pressure head 48C. This shape is preferred as the shape of a contact when this contact/connection member 34 is processed into a contact part. The thus flattened contact/connection member 34 is wound around the take-up reel 38 of the take-up unit 33 while the insertion paper 3 is inserted between the layers of the contact/connection member 34.

In the above embodiment, a contact/connection member in which a single contact/connection member wire material 18 is fused on a single belt-shaped contact/connection member base material 12 has been described. However, the present invention is not limited to this and may be applied to a contact/connection member in which two or more contact/connection member wire materials are fused on the contact/connection member base material.

Figure 22:
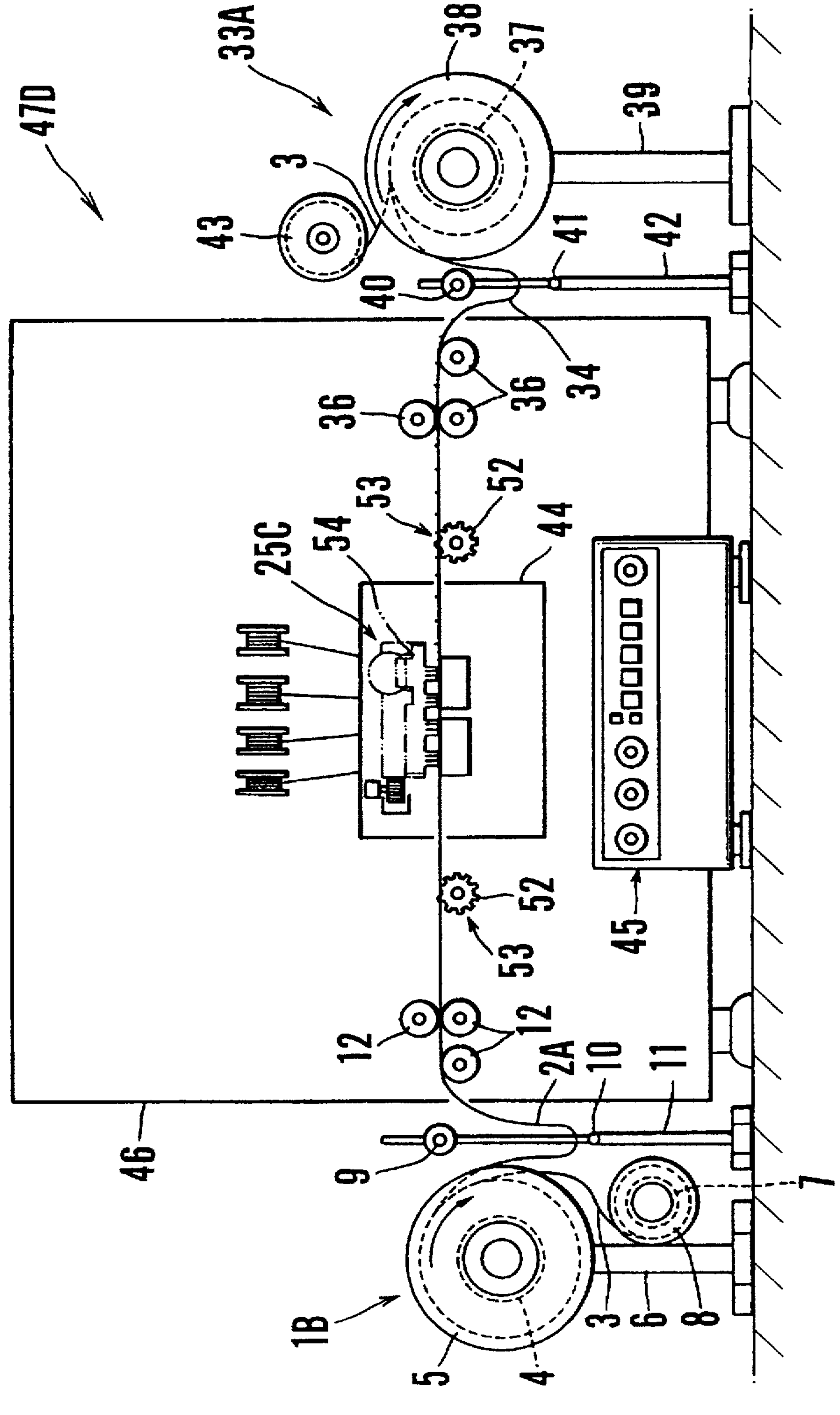
FIG. 22 is a schematic front view showing the entire configuration of a contact/connection member production apparatus according to a fifth embodiment of the present invention.

Further, the contact/connection member wire material may be fused in a longitudinal direction of the contact/connection member base material as in the above embodiment or may be fused in a transverse direction of the contact/connection member base material at fixed intervals in a longitudinal direction by supplying the contact/connection member wire material in a transverse direction of the contact/connection member base material as shown in FIGS. 22 to 24, arranging the variable rotation roller electrode for fusion rotatably in a transverse direction of the contact/connection member base material, and directly cooling the variable rotation roller electrode in the cooling tank. In the latter case, the contact/connection member base material is conveyed intermittently. According to the structure of a contact part, the contact/connection member wire material may be supplied at an angle with respect to a longitudinal direction of the contact/connection member base material. To cool the variable rotation roller electrode, a cooling tank containing cooling water as described above is used, or cooling water is poured directly on the roller electrode from the nozzle. To fuse the contact/connection member wire material on the contact/connection member base material, a lap resistance welding such as a spot welding, a projection welding or combination thereof is preferably used and ultrasonic welding may be used in substitution for the seam welding described above.

Figure 35:
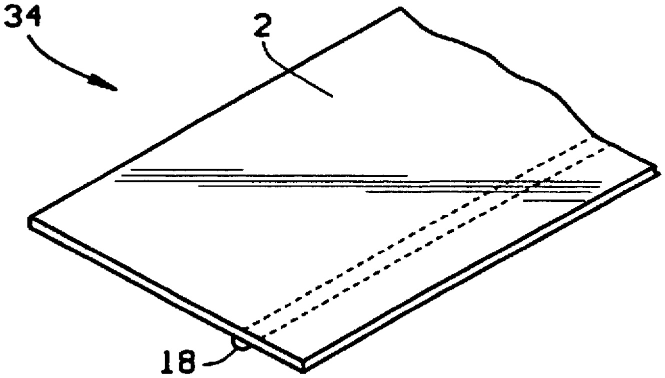
FIG. 35 is a perspective view of a contact/connection member produced by the apparatus of the seventh embodiment.

A description is subsequently given of the shape of a contact part obtained by processing a contact/connection member, as shown in FIG. 35, produced with the contact/connection member production apparatus of the present invention.

Figure 36A:
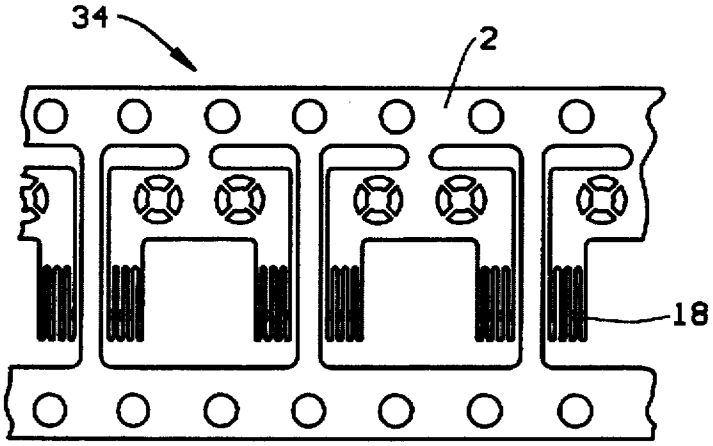
FIG. 36A shows an example of a pressed contact part fabricated from a contact/connection member produced by the contact/connection member production apparatus of the present invention.
Figure 36B:
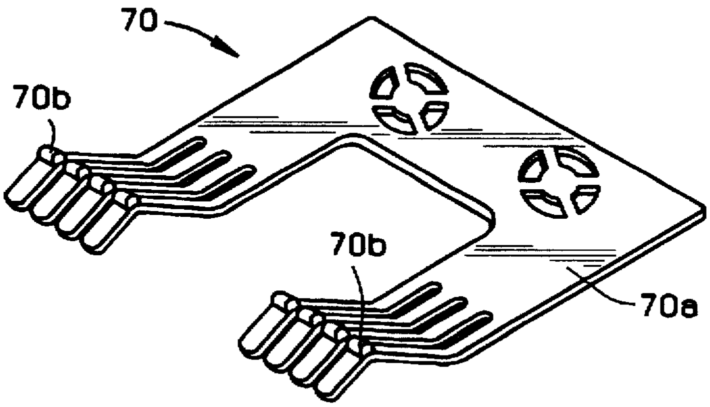
FIG. 36B shows a contact part which has been shaped after pressing.

FIGS. 36A and 36B show a contact part called multi-wiper for use in a linear trimmer. A contact/connection member 34 is simply pressed as shown in FIG. 36A and processed in such a manner that a contact portion 70*b* is bent to obtain a contact part 70 as shown in FIG. 36B. A major portion 70*a* of this contact part 70 is made of an inexpensive base metal material and only a contact portion 72*b* is made of an expensive precious metal material.

Figure 37:
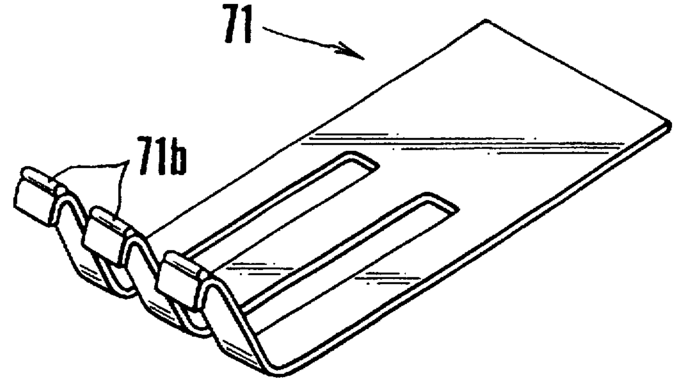
FIG. 37 is a perspective view of another example of a contact part fabricated from a contact/connection member produced by the apparatus of the present invention.

FIG. 37 shows a contact part called a rake contact for use in a position sensor whose contact portion 71*b* only is also made of a precious metal material.

Figure 38A:
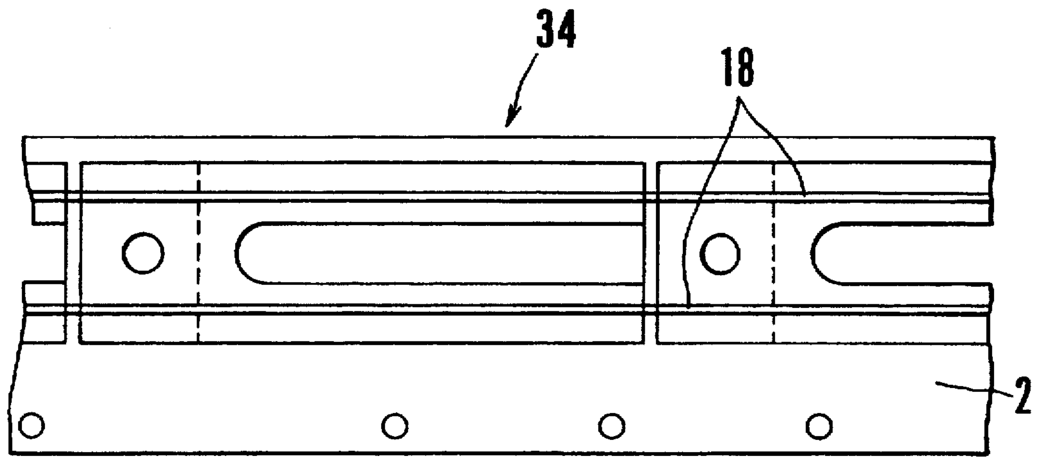
FIG. 38A shows another example of a pressed contact part fabricated from a contact/connection member produced by the apparatus of the present invention.
Figure 38B:
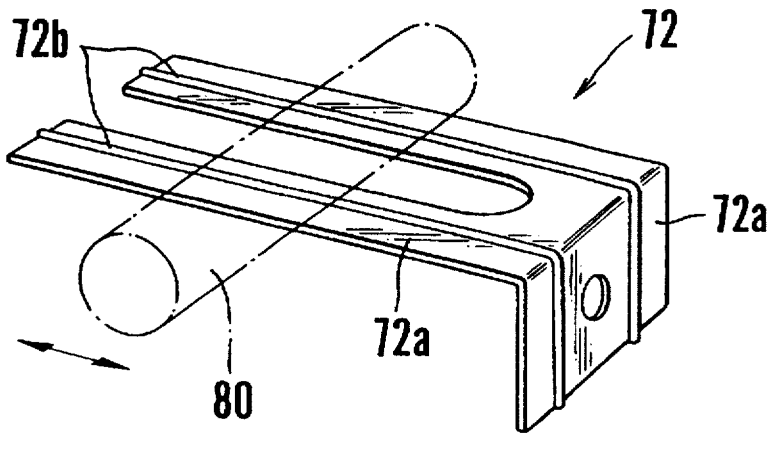
FIG. 38B shows a contact part which has been shaped after pressing.

FIGS. 38A and 38B show a motor brush.

A motor brush having a contact portion 72*b* made of a precious metal material formed in a longitudinal direction of the brush as shown in FIG. 38B is obtained by pressing a contact/connection member 34 as shown in FIG. 38A. When this brush is used, there is no problem with electrical contact even if the rotation contact shaft 80 (shown by a chain line) of the motor is displaced in a direction shown by an arrow during the use of the brush.

Figure 39A:
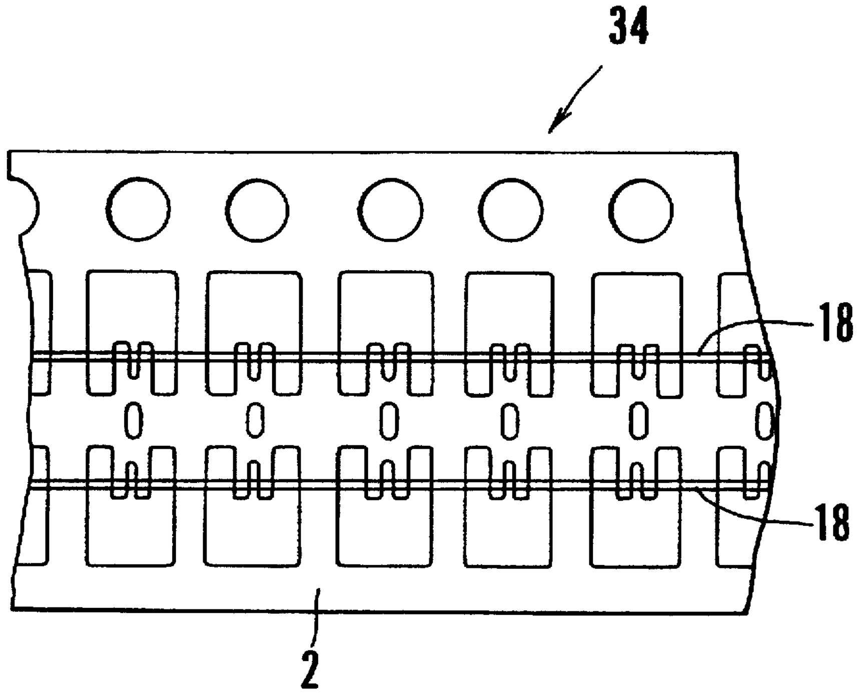
FIG. 39A shows still another example of a pressed contact part fabricated from a contact/connection member produced by the apparatus of the present invention.
Figure 39B:
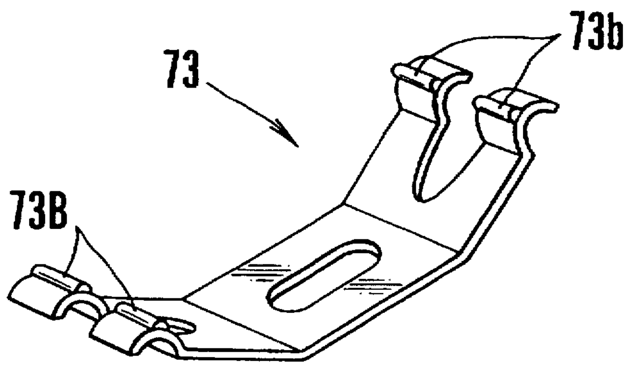
FIG. 39B shows a contact part which has been shaped after pressing.

FIGS. 39A and 39B show a contact for use in a slide switch.

Figure 40A:
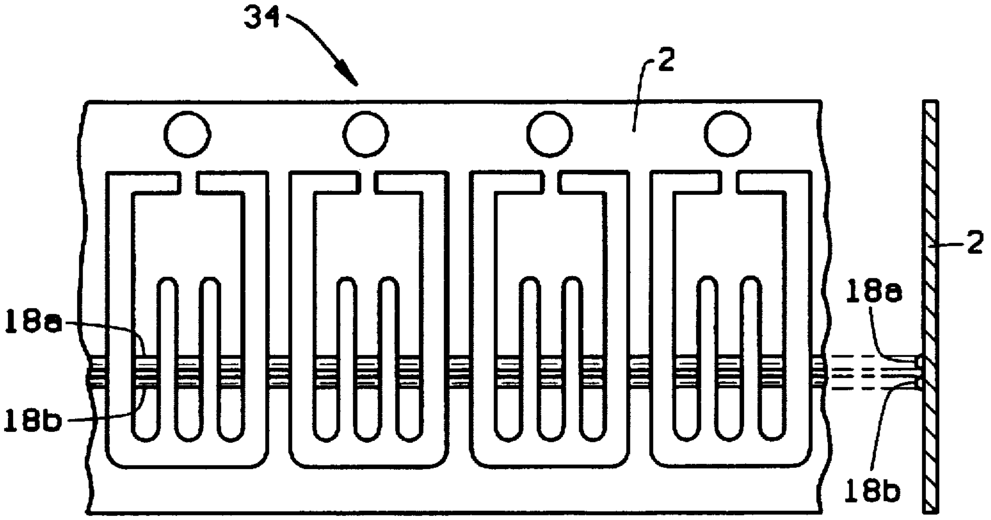
FIG. 40A shows still another example of a pressed contact part fabricated from a contact/connection member produced by the apparatus of the present invention.
Figure 40B:
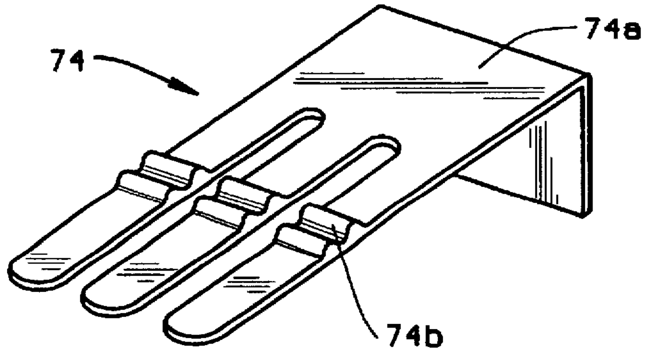
FIG. 40B shows a contact part which has been shaped after pressing.

FIG. 40A and 40B show another example of a micromotor brush.

A contact/connection member 34 has two precious metal wire materials 18*a*, 18*b* of semi-circular section welded on a base metal 2 very closely with each other. The contact/connection member 34 is pressed as shown in FIG. 40A to obtain a micromotor brush 74 with double contacts 74*b* made of a precious metal material as shown in FIG. 40B. The remaining major part 74*a* of the brush 74 is made of a base metal.

Figure 41A:
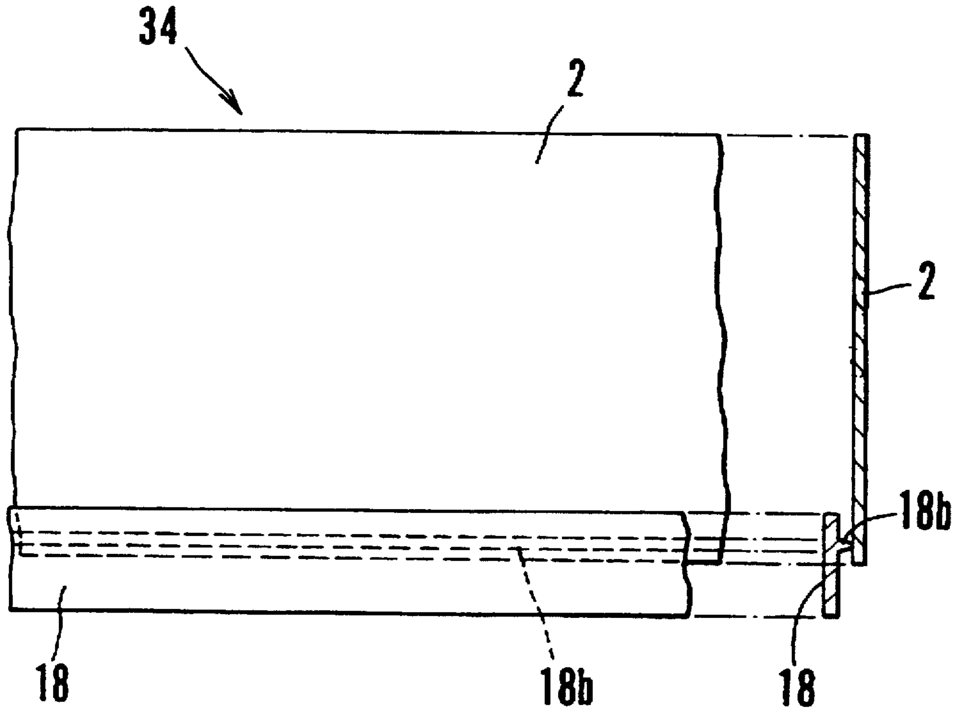
FIG. 41A shows still another example of a pressed contact part fabricated from a contact/connection member produced by the apparatus of the present invention.
Figure 41B:
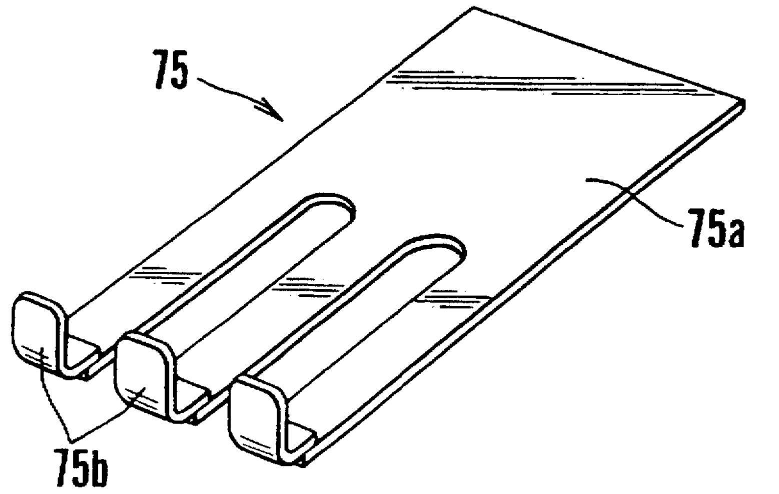
FIG. 41B shows a contact part which has been shaped after pressing.

FIGS. 41A and 41B show another example of a rake contact.

A contact/connection member 34 has a precious metal wire material 18 of a rectangular section with a single projection 18*b* as shown in FIG. 7A welded on one side of a base material 2. A contact of rake type is obtained by pressing the contact/connection member 34 thus produced so that the wire material 18 is raised as shown in FIG. 41B. In the rake type contact thus obtained, a precious metal is used only for the tips 75*b* of the contact and the major part 75*a* of the contact is made of a base metal.

A contact part 73 as shown in FIG. 39B is obtained simply by pressing a contact/connection member 34 as shown in FIG. 39A and then bending its contact portion 73*b*.

As is obvious from the above description, the following effects can be obtained from the present invention.

(1) Since the contact/connection member production apparatus of the present invention comprises a contact/connection member base material supply unit for supplying a contact/connection member base material wound around a supply reel over vertical positioning guide rollers and horizontal positioning guide rollers, a contact/connection member wire material supply unit for supplying a contact/connection member wire material wound around a supply reel through a guide nozzle to the front surface of the contact/connection member base material from the contact/connection member base material supply unit, a seam welding unit which consists of a mother rotation electrode for supporting the contact/connection member base material and diffusion bonding the contact/connection member wire material to the contact/connection member base material while the contact/connection member wire material is placed upon the contact/connection member base material by the contact/connection member wire material supply unit and a variable rotation roller electrode for pressing the contact/connection member base material and the contact/connection member wire material against the mother rotation electrode, and a contact/connection member take-up unit for causing a contact/connection member for electric and electronic parts in which the contact/connection member base material and the contact/connection member wire material have been diffusion bonded by the seal welding unit to pass over the horizontal positioning guide rollers and winding it around a take-up reel, the contact/connection member wire material and the contact/connection member base material can be supplied to the seam welding unit and continuously bonded together by diffusion bonding while the contact/connection member wire material is placed upon the contact/connection member base material.

Therefore, a contact/connection member for producing a terminal or the like can be produced efficiently at a low cost.

(2) Since the contact/connection member wire material and the contact/connection member base material which are different metals are diffusion bonded by the seam welding unit according to (1) described above, they can be bonded together without fail, thereby greatly reducing the production of defective products.

(3) The contact/connection member wire material can be diffusion bonded to the contact/connection member base material at a predetermined position precisely by the seam welding unit according to (1) described above. Therefore, a high-quality contact/connection member can be produced.

(4) The same effects as those of (1) to (3) described above can be obtained in claims 2, 3, 4, 5, 6 and 7.

In the present invention, since not only the mother rotation electrode but also the variable rotation roller electrode of the welding unit are cooled directly with cooling water, heat generated by a welding current is absorbed and a rise in the temperature of the welding electrode can be suppressed. Therefore, the position of the contact/connection member wire material to be fused on the contact/connection member base material can be controlled within an allowable error of a set value. As a result, a contact/connection member and a contact part having extremely high accuracy can be produced.

What is claimed is:

1. A contact/connection member production apparatus comprising:

a contact/connection member base material supply unit for continuously supplying a belt-shaped contact/connection member base material which is a flexible base metal material;

a contact/connection member wire material supply unit for continuously supplying a contact/connection member wire material which is a precious metal material;

a welding unit for diffusion bonding the contact/connection member wire material to a predetermined position of the front or rear surface of the contact/connection member base material by applying electricity to a mother rotation electrode and a variable rotation roller electrode while the contact/connection member wire material is pressed against the front or rear surface of the contact/connection member base material between these electrodes at a welding location; and a contact/connection member take-up unit for winding a contact/connection member in which the contact/connection member wire material is fusion bonded to the contact/connection member base material.

2. A contact/connection member production apparatus according to claim 1 which further comprises, at a downstream of the welding unit, a pressure unit for applying pressure to bond the contact/connection member wire material and the contact/connection member base material diffusion bonded by the welding unit without fail.

3. A contact/connection member production apparatus according to claim 2 which further comprises a clean chamber which is in an atmosphere for preventing the oxidation of at least a pressure section of the pressure unit and a welding section of the welding unit.

4. A contact/connection member production apparatus according to claim 1, wherein the contact/connection member base material supply unit supplies the contact/connection member base material by engaging a sprue gear with a sprue hole formed on at least one side edge of the contact/connection member base material and the contact/connection member take-up unit winds the contact/connection member base material by engaging a sprue gear with the sprue hole of the contact/connection member base material.

5. A contact/connection member production apparatus comprising:

a contact/connection member base material supply unit for continuously supplying a belt-shaped contact/connection member base material which is a flexible base metal material;

contact/connection member wire material supply units for continuously supplying contact/connection member wire materials which are a precious metal material to the front and rear surfaces of the contact/connection member base material;

a welding unit for diffusion bonding the contact/connection member wire material to predetermined positions of the front and rear surfaces of the contact/connection member base material by applying electricity to a pair of variable rotation roller electrodes while the contact/connection member wire materials are pressed against the front and rear surfaces of the contact/connection member base material between these electrodes at a welding location; and a contact/connection member take-up unit for winding a contact/connection member in which the contact/connection member wire materials are fused on the contact/connection member base material.

6. A contact/connection member production apparatus comprising:

a contact/connection member base material supply unit for continuously supplying a belt-shaped contact/connection member base material which is a flexible base metal material;

a contact/connection member wire material supply unit for continuously supplying a contact/connection member wire material which is a precious metal material;

a welding unit for diffusion bonding the contact/connection member wire material to a predetermined position of the rear surface of the contact/connection member base material by applying electricity to a mother rotation electrode arranged above a welding location and a variable rotation roller electrode arranged below the welding location while the contact/connection member wire material is pressed against the rear surface of the contact/connection member base material between these electrodes at the welding location;

a cooling unit for cooling the mother rotation electrode of the welding unit and cooling directly the variable rotation roller electrode with cooling water; and a contact/connection member take-up unit for winding a contact/connection member in which the contact/connection member wire material is fused on the contact/connection member base material.

7. A contact/connection member production apparatus according to claim 6, wherein the cooling unit has a cooling tank containing cooling water and the variable rotation roller electrode rotates while part thereof is immersed in the cooling water of the cooling tank.

8. A contact/connection member production apparatus according to claim 6, wherein the cooling unit has means for directly pouring cooling water on the variable rotation roller electrode.

9. A contact/connection member production apparatus according to claim 1, wherein the contact/connection member wire material is supplied in a longitudinal direction of the contact/connection member base material.

10. A contact/connection member production apparatus according to claim 1, wherein the contact/connection member wire material is supplied in a traverse direction of the contact/connection member base material.

11. A contact/connection member production apparatus according to claim 1, wherein the contact/connection member base material 2 is a belt-shaped continuous long material having a thickness of 0.03 to 3.0 mm and a width of 3.0 to 300 mm and selected from among phosphor bronze, german silver, 42 Alloy, covar, austenite stainless steel, ferrite stainless steel, martensite stainless steel, brass, copper-nickel alloy, copper-beryllium alloy, copper, magnetic materials, laminate materials consisting of no-ferrous materials and ferrous materials, laminate materials consisting of base metals and precious metals, and bonded materials consisting of non-ferrous or ferrous metals and polymer films.

12. A contact/connection member production apparatus according to claim 1, wherein the contact/connection member wire material is a linear material having a diameter of 0.03 to 3.00 mm, a stripe-shaped material measuring 0.03×0.06 mm to 3.0 to 3.0 mm, a shell-shaped material measuring 0.03×0.08 mm to 2.0×3.0 mm, or a hoop-shaped material measuring 0.01 to 0.50 mm to 1.0 to 10.0 mm and selected from among gold, gold alloys, platinum, platinum alloys, silver, silver alloys, palladium, palladium alloys, three-element precious metal alloys, four-element precious metal alloys, five-element precious metal alloys, six-element precious metal alloys and seven-element precious metal alloys.

13. A contact/connection member production apparatus according to claim 1, wherein a plurality of contact/connection member wire materials are supplied in parallel to the contact/connection member base material.

14. A contact/connection member for electric and electronic parts produced by the contact/connection member production apparatus of claim 1, wherein the contact/connection member base material is a belt-shaped continuous long material having a thickness of 0.03 to 3.0 mm and a width of 3.0 to 300 mm and selected from among phosphor bronze, german silver, 42 Alloy, covar, austenite stainless steel, ferrite stainless steel, martensite stainless steel, brass, copper-nickel alloy, copper-beryllium alloy, copper, magnetic materials, laminate materials consisting of no-ferrous materials and ferrous materials, laminate materials consisting of base metals and precious metals, and bonded materials consisting of non-ferrous or ferrous metals and polymer films; and the contact/connection member wire material is a linear material having a diameter of 0.03 to 3.00 mm, a stripe-shaped material measuring 0.03×0.06 mm to 3.0 to 3.0 mm, a shell-shaped material measuring 0.03×0.08 mm to 2.0×3.0 mm, or a hoop-shaped material measuring 0.01 to 0.50 mm to 1.0 to 10.0 mm and selected from among gold, gold alloys, platinum, platinum alloys, silver, silver alloys, palladium, palladium alloys, three-element precious metal alloys, four-element precious metal alloys, five-element precious metal alloys, six-element precious metal alloys and seven-element precious metal alloys.

15. A contact/connection member production apparatus according to claim 5, wherein the contact/connection member wire material is supplied in a longitudinal direction of the contact/connection member base material.

16. A contact/connection member production apparatus according to claim 5, wherein the contact/connection member wire material is supplied in a traverse direction of the contact/connection member base material.

17. A contact/connection member production apparatus according to claim 5, wherein a plurality of contact/connection member wire materials are supplied in parallel to the contact/connection member base material.

18. A contact/connection member production apparatus according to claim 6, wherein the contact/connection member wire material is supplied in a longitudinal direction of the contact/connection member base material.

19. A contact/connection member production apparatus according to claim 6, wherein the contact/connection member wire material is supplied in a traverse direction of the contact/connection member base material.

20. A contact/connection member production apparatus according to claim 6, wherein a plurality of contact/connection member wire materials are supplied in parallel to the contact/connection member base material.

* * * * *